(12) United States Patent
Ohara et al.

(10) Patent No.: US 7,649,491 B2
(45) Date of Patent: Jan. 19, 2010

(54) DISTANCE MEASURING APPARATUS, DISTANCE MEASURING METHOD, REFLECTOR AND COMMUNICATION SYSTEM

(75) Inventors: Hideyuki Ohara, Kyoto (JP); Takehiro Kawai, Kyoto (JP); Keisuke Saito, Osaka (JP); Kosuke Hayama, Kyoto (JP)

(73) Assignee: Omron Corporation, Kyoto (JP)

( * ) Notice: Subject to any disclaimer, the term of this patent is extended or adjusted under 35 U.S.C. 154(b) by 61 days.

(21) Appl. No.: 11/885,973

(22) PCT Filed: Sep. 1, 2005

(86) PCT No.: PCT/JP2005/016005

§ 371 (c)(1),
(2), (4) Date: Sep. 10, 2007

(87) PCT Pub. No.: WO2006/095463

PCT Pub. Date: Sep. 14, 2006

(65) Prior Publication Data

US 2008/0150699 A1 Jun. 26, 2008

(30) Foreign Application Priority Data

Mar. 9, 2005 (JP) ............................. 2005-066298

(51) Int. Cl.
*G01S 3/08* (2006.01)
(52) U.S. Cl. ........................ 342/127; 342/118; 356/5.1
(58) Field of Classification Search .................. 342/118
See application file for complete search history.

(56) References Cited

U.S. PATENT DOCUMENTS

2005/0237953 A1* 10/2005 Carrender et al. ........... 370/278
2006/0124738 A1* 6/2006 Wang et al. .................. 235/385

FOREIGN PATENT DOCUMENTS

| EP | 1 239 634 A2 | 9/2002 |
| GB | 2336493 A * | 10/1999 |
| JP | 8-96186 | 4/1996 |
| JP | 8-194058 | 7/1996 |
| JP | 8-248127 | 9/1996 |
| JP | 11-142507 | 5/1999 |
| JP | 2000-171550 | 6/2000 |
| JP | 2002-323556 | 11/2002 |
| JP | 2004-507714 | 11/2004 |
| WO | WO 01/67413 | 9/2001 |
| WO | WO 01/94974 | 12/2001 |

OTHER PUBLICATIONS

Austrian Search Report and Written Opinion, dated Apr. 8, 2009 per Austrian cover letter.

* cited by examiner

*Primary Examiner*—Thomas H Tarcza
*Assistant Examiner*—Timothy A Brainard
(74) *Attorney, Agent, or Firm*—Dickstein Shapiro LLP

(57) ABSTRACT

A transmission controller 7B is configured to transmit an R/W request signal for requesting transmission of a tag response signal to a RFID tag 1 twice. At this time, a frequency controller 7A controls a PLL section 5A to transmit the R/W request signal via different carrier frequencies. A phase information acquirer 8A detects a phase change amount of the tag response signal that is transmitted via different carrier frequencies. A distance calculator 8B calculates the distance between the reader/writer 2 and the RFID tag 1 on the basis of the phase change amount.

22 Claims, 25 Drawing Sheets

FIG. 3A
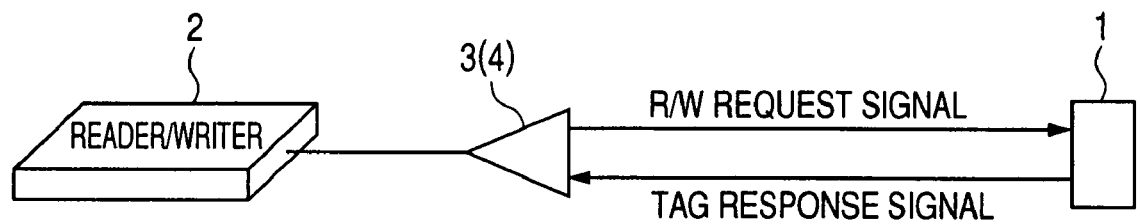
FIG. 3B
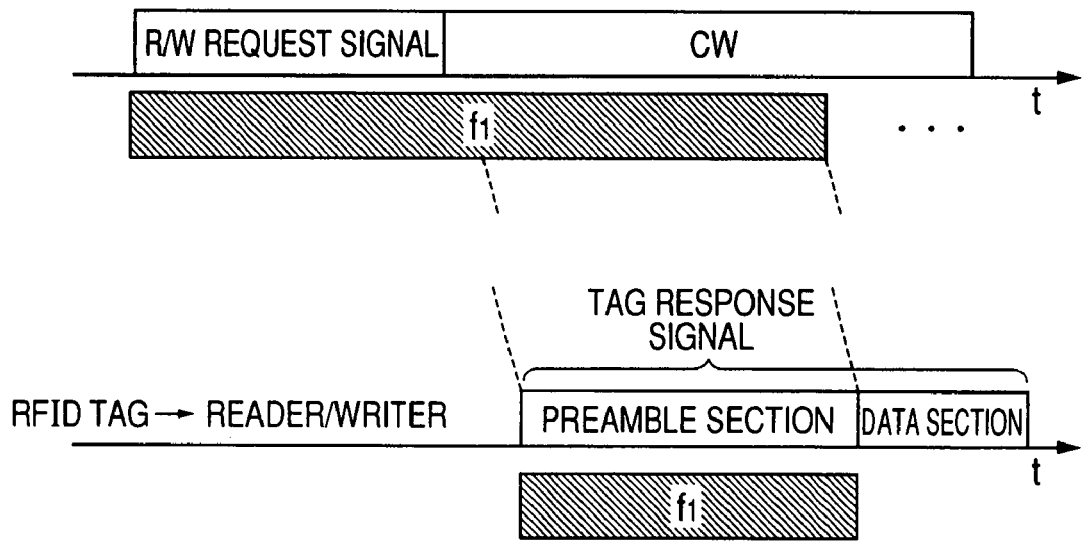
FIG. 3C

FIG. 12A
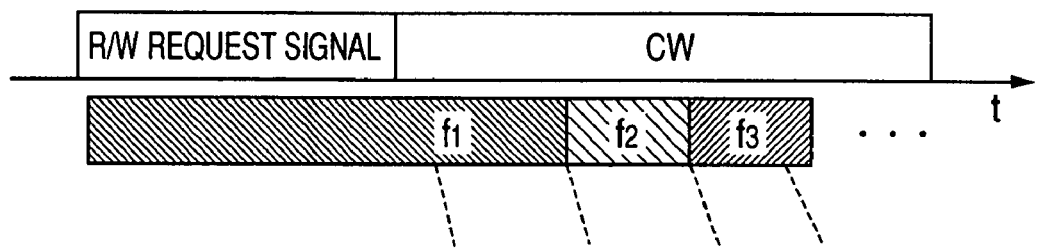
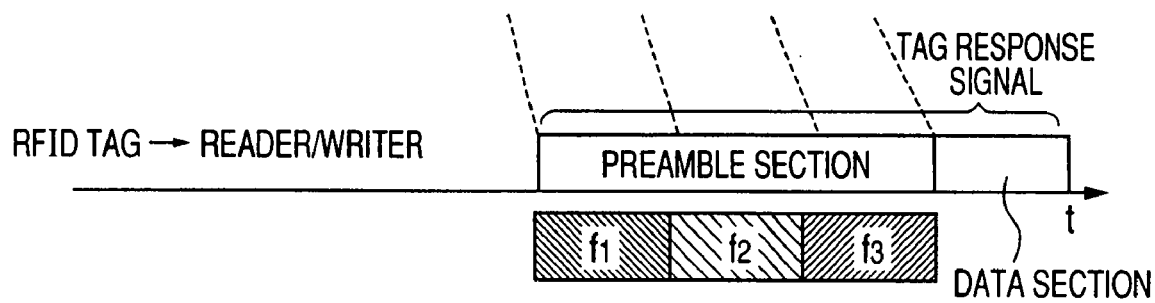
FIG. 12B

DISTANCE MEASURING APPARATUS, DISTANCE MEASURING METHOD, REFLECTOR AND COMMUNICATION SYSTEM

This Application is the National Phase of International Application No. PCT/JP2005/016005 filed Sep. 1, 2005, which designated the U.S. and was not published under PCT Article 21(2) in English, and this application claims, via the aforesaid International Application, the foreign priority benefit of and claims the priority from Japanese Application No. 2005-066298, filed Mar. 9, 2005, the complete disclosures of which are incorporated herein by reference.

TECHNICAL FIELD

The present invention relates to a distance measuring apparatus, a distance measuring method, a reflector, and a communication system, which perform wireless communication with a reflector via radio waves.

BACKGROUND ART

Recently, RFID (Radio Frequency Identification) tags (wireless tags) have been widely used. The RFID tags are used as a substitute for barcodes. The RFID tags are gathering popularity particularly in the field of distribution and are expected to spread widely in the near future.

Presently, as a frequency band exclusively for the RFID tags purpose, 13.56 MHz band, a so-called UHF band that is somewhere between 800 MHz and 950 MHz, and 2.45 GHz band are used. Among these bands, radio waves using the UHF band or the 2.45 GHz band are advantageous over radio waves using the 13.56 MHz in that it is easy to increase a communication range. In addition, the UHF band radio waves are advantageous over the 2.4 GHz band radio waves in that it is easy to go behind the object. For this reason, RFID tags and reader/writers using the UHF band radio waves are being developed.

In the case of using the UHF band radio waves, it is possible to increase the communicable distance between the reader/writer and a wireless tag from several ten centimeters to several meters, compared to the case of using the 13.55 MHz band radio waves which are widely used at present. Accordingly, by utilizing the UHF band radio waves, it becomes possible to relatively greatly increase a communication area which is a spatial area in which the reader/writer can communicate with the wireless tags.

Meanwhile, in order to estimate the location of the RFID tags, there has been suggested a technology for measuring the distance between the RFID tags and a communication station in communication with the RFID tags. As an example, a technology is known in which a plurality of base stations receive signals from an active IC tag as the RFID tag, and the distance to and location of the active IC tag are estimated on the basis of the reception signals from the active IC tag. In the example, the distance between each of the base stations and the active IC tag is estimated on the basis of the signal intensity of the reception signals from the active IC tag. That is, the distance estimation is performed by utilizing correlation between the reception signal intensity and the distance. Also is known a method in which by preparing access points of which the location is known, signals are received simultaneously from the active IC tag and the access points, and the delay amount between receiving timings for the respective signals, thereby estimating the distance to the active IC tag.

As shown in FIG. 26, Japanese Patent Publication No. 2004-507714T (published on Mar. 11, 2004; hereinafter will be referred to as Patent Document 1) discloses an RF communication system in which an interrogator 36 as a reader transmits signals 40 and 42 having different frequencies to an RF tag 38, and the number of null points in combined waves that are obtained by superimposing the two signals onto each other is counted, thereby estimating the distance between the interrogator 36 and the RF tag 38.

DISCLOSURE OF THE INVENTION

Problem to be Solved by the Invention

Although the RFID communication system using the UHF band radio waves enables a long distance communication, it becomes possible to uselessly communicate with an RFID tag that is located far away and does not need to be communicated with. Thus, there are problems in that useless processings are performed to the RFID tag, and the response performance may be deteriorated by being influenced by multiple paths. In order to solve such problems, a method can be conceived in which by allowing the reader/writer to calculate the distance to each RFID tag, the RFID tags that should be subjected to processes such as analysis or rewriting of the data section are chosen. The prior method of calculating the distance between the reader/writer and the RFID tag has the following problems.

First, the estimation of the distance based on the signal intensity of the reception signals from the RFID tag or the delay time results in a low measurement precision. The precision obtainable from the above distance estimation is actually about in the range of 1 meter to several meters. For example, when applied to a distribution management system, such precision is not practical, but a higher distance measurement precision is required.

In the technology disclosed in Patent Document 1, since the distance is estimated by counting the number of null points in the combined waves obtained by superimposing the two signal having different frequencies, the distance estimated has very poor precision. More specifically, according to the example described in Paragraph [0025] of Patent Document 1, when a first signal of 880 MHz and a second signal of 884 MHz were used, a first null point was found at a position located about 37.5 meters from the interrogator 36 and additional null points were found every 75 meters from the first null point. For example, if three null points were found between the interrogator 36 and the RF tag 38, the estimated distance between the interrogator 36 and the RF tag 38 is in the range of 187.5 meter to 262.5 meter. Therefore, 75 meter is an error range. In the case of occurrence of multiple paths, radio signals may propagate to the longer distance, and thus the calculate distance may become different from the actual distance to the RFID tag.

As shown in FIG. 27, EP1239634A2 (hereinafter will be referred to as Patent Document 2) discloses a communication apparatus 138 that wirelessly communicates with an RFID tag. Reflection signals from the RFID tag are received through an antenna 140, reception signals inputted from a circulator 92 and carrier signals inputted from a circulator 90 and a splitter 98 are multiplied by mixers 100 and 102 to generate an I signal and an Q signal, and the amplitude and phase of the reflection signals from the RFID tag are calculated on the basis of the I and Q signals. Also is disclosed a method of calculating the distance to the RFID tag by using the phase difference between the carrier signals and the reflection signals from the RFID tag.

The present invention has been made in view of such problems, and an object of the invention is to provide a distance measuring apparatus, a distance measuring method, and a communication system capable of enabling to measure the distance to RFID tags with high precision. Another object of the invention is to provide a distance measuring apparatus, a distance measuring method, a reflector and a communication system capable of enabling to measure the distance to tags without using special RFID tags.

How to Solve the Problems

In order to solve the problems, a distance measuring apparatus according to the invention is characterized by comprising:

a transmitter, that transmits a request signal, which is a signal composed of one frame, from an antenna to the outside via radio waves having a plurality of different carrier frequencies;

a receiver, that receives a reflection signal which is a signal composed of one frame and is obtained when the request signal transmitted from the transmitter is reflected by a reflector while being modulated;

a phase information acquirer, that calculates an amount of phase change between the reflection signal received by the receiver and the request signal for each of the carrier frequencies transmitted from the transmitter; and a distance calculator, that calculates a distance between the antenna and the reflector on the basis of the carrier frequencies and the phase change amount for each of the carrier frequencies acquired by the phase information acquirer.

Here, the reflector is an RFID tag that is equipped with an IC for wireless communication, a storage, and an antenna. Examples of the RFID tag include a passive RFID tag that does not have a power source such as battery, operates circuits by drawing energy from radio waves transmitted from a reader/writer, thus performing wireless communication with the reader/writer, and an active RFID tag that has a power source such as battery. Also, the RFID tag may have its own unique ID information.

A distance measuring method according to the invention is characterized by comprising:

a transmitting step of transmitting a request signal, which is a signal composed of one frame, from an antenna to the outside via radio waves having a plurality of different carrier frequencies;

a receiving step of receiving a reflection signals which is a signal composed of one frame and is obtained when the request signal transmitted in the transmitting step is reflected from a reflector while being modulated;

a phase information acquisition step of calculating an amount of phase change between the reflection signal received in the receiving step and the request signal for each of the carrier frequencies transmitted in the transmitting step; and a distance calculating step of calculating a distance between the antenna and the reflector on the basis of the carrier frequencies and the phase change amount for each of the carrier frequencies acquired in the phase information acquiring step.

According to the above-mentioned configuration and method, it is configured to receive the reflection signal that is transmitted from the reflector via a plurality of different carrier frequencies. The reflection signal transmitted via the plurality of different carrier frequencies has different phase states that differ for each of the carrier frequencies depending on the distance between the reflector that transmitted the reflection signal and the distance measuring apparatus.

According to the above-mentioned configuration and method, the phase change amount of the reflection signal is acquired for each of the carrier frequencies and the distance is calculated on the basis of the phase change amount and the carrier frequencies. In this case, by acquiring the carrier frequencies and the phase change amount of the signal transmitted via the plurality of carrier frequencies, it becomes possible to calculate the distance with high precision, which will be described in detail later. In other words, according to above-mentioned configuration and method, it is possible to provide a distance measuring apparatus capable of calculating the distance with high precision and high accuracy.

According to the distance measuring apparatus of the invention, in the above configuration, the transmitter may set a plurality of divided periods in a period for transmitting one request signal, and may control such that the different carrier frequencies are used for the respective divided periods.

According to the distance measuring method of the invention, in the above method, the transmitting step may be configured to set a plurality of divided periods in a period for transmitting one request signal, and to control such that the different carrier frequencies are used for the respective divided periods.

According to the above-mentioned configuration and method, one request signal is transmitted via different carrier frequencies in each of the divided periods. In this case, the reflection signal is also transmitted via different carrier frequencies in each of the divided periods. Accordingly, the distance calculator becomes possible to calculate the distance by analyzing the signal states of one reflection signals for each of the divided periods. In other words, the distance can be calculated only by transmitting and/or receiving one request signal and one reflection signal. Thus, it becomes possible to reduce the number of signal communications required for the distance calculation. Accordingly, it is possible to calculate the distance without deteriorating the communication efficiency.

According to the distance measuring apparatus of the invention, in the above configuration, the transmitter may transmit the request signal via one of the carrier frequencies composed of different carrier frequency components.

According to the distance measuring method of the invention, in the above method, the transmitting step may be configured to transmit the request signal via one of the carrier frequencies composed of different carrier frequency components.

According to the above-mentioned configuration and method, one request signal is transmitted via one carrier frequencies composed of different carrier frequency components. In this case, the reflection signal is also transmitted via one carrier frequencies composed of different carrier frequency components. Accordingly, the distance calculator becomes possible to calculate the distance by analyzing the signal states of one reflection signal for each of the frequency components. In other words, the distance can be calculated only by transmitting and/or receiving one request signal and one reflection signal. Thus, it becomes possible to reduce the number of signal communications required for the distance calculation. Accordingly, it is possible to calculate the distance without deteriorating the communication efficiency.

According to the distance measuring apparatus of the invention, in the above configuration, the reflection signal may be transmitted from the reflector via three or more different carrier frequencies. The phase information acquirer may acquire the phase change amount by selecting signals of two carrier frequencies having signal states which satisfy a prescribed criterion for calculating the distance, from signals of the carrier frequencies.

According to the distance measuring method of the invention, in the above method, the reflection signal may be transmitted from the reflector via three or more different carrier frequencies. The phase information acquirer may acquire the phase change amount by selecting signals of two carrier frequencies having signal states which satisfy a prescribed criterion for calculating the distance, from signals of the carrier frequencies.

The case may be considered in which depending on carrier frequencies, the reflection signal may have a signal state that is not suitable for the distance calculation due to reasons such as occurrence of multiple paths of the reflection signal. To the contrary, according to the above-mentioned configuration and method, the signals of two carrier frequencies of which the signal states satisfy a prescribed criterion for the distance calculation are selected from signals of three or more, different carrier frequencies, and the phase change amount is detected on the basis of the signals. Accordingly, it is possible to increase the detection precision of the phase change amount and thus to increase the precision of the distance calculation.

In the above configuration, the distance measuring apparatus of the invention may further comprise a frequency converter, that performs a frequency conversion processing with respect to the reflection signal received. The frequency converter may convert the reflection signal to an I signal and a Q signal.

In the above method the distance measuring method of the invention may further comprise a frequency converting step of performing a frequency conversion processing with respect to the reflection signal received. The frequency converting step converts the reflection signals to an I signal and a Q signal.

According to the above-mentioned configuration and method, the reflection signal received is subjected to frequency conversion by being converted to the I signal and the Q signal. Accordingly, it becomes easy to detect the phase.

According to the distance measuring apparatus of the invention, in the above configuration, the distance calculator may calculate the distance with high-resolution spectrum analysis.

According to the distance measuring method of the invention, in the above method, the distance calculating step may calculate the distance with high-resolution spectrum analysis.

Conventionally, the high-resolution spectrum analysis has been used for the purpose of estimating direction of arrival of radio waves by receiving, as an input, reception signals received through a plurality of antenna elements. To the contrary, according to the above-mentioned configuration and method, the application model of the high-resolution spectrum analysis is changed by using the reception signal of each of the carrier frequencies as a substitute for the reception signal received through the antenna elements, used in the conventional high-resolution spectrum analysis for estimation of the direction of arrival.

In such a high-resolution spectrum analysis, since values for estimation can be calculated on the basis of the most likely values, even in the case of occurrence of multiple paths, it is possible to exclude the distance associated with the multiple paths from consideration. In other words, according to the above-mentioned configuration and method, it is possible to calculate the distance with high accuracy even in the occurrence of multiple paths.

According to the distance measuring apparatus of the invention, in the above configuration, the distance calculator may utilize a MUSIC (MUltiple SIgnal Classification) method as the high-resolution spectrum analysis, in which the reflection signal received via the different carrier frequencies is used as an input, an MUSIC evaluation function is obtained using a mode vector as a function of the distance, and the distance is calculated by obtaining peak values of the MUSIC evaluation function.

In the above-mentioned configuration, the distance measuring apparatus of the invention may be configured such that the distance calculator utilizes an MUSIC (MUltiple SIgnal Classification) method as the high-resolution spectrum analysis, in which the reflection signal received via the plurality of different carrier frequencies is used as an input of the MUSIC method; and an MUSIC evaluation function is derived using a mode vector as a function of the distance to obtain peak values of the MUSIC evaluation function, thereby calculating the distance.

According to the distance measuring method of the invention, in the above method, the distance calculator may utilize a MUSIC (MUltiple Signal Classification) method as the high-resolution spectrum analysis, in which the reflection signal received via the different carrier frequencies is used as an input, an MUSIC evaluation function is obtained using a mode vector as a function of the distance, and the distance is calculated by obtaining peak values of the MUSIC evaluation function.

Although the MUSIC evaluation function generally has only one peak value, in the case of occurrence of multiple paths, a plurality of peak values may exist. Even in such a case, because the distance corresponding to the multiple paths is longer than the distance that should be calculated, by selecting the shortest of the distances corresponding to the peak values as the distance to be calculated, it becomes possible to calculate the distance with high accuracy.

According to the distance measuring apparatus of the invention, in the above configuration, the distance calculator may calculate the distance also on the basis of a reception intensity of the reflection signal received.

According to the distance measuring method of the invention, in the above method, the distance calculating step may calculate the distance on the basis of a reception intensity of the reflection signal received.

According to the above-mentioned configuration and method, the distance is calculated also on the basis of the reception intensity of the reflection signal. When there are a plurality of distance value candidates, for instance, by taking the reception intensity into consideration, it becomes possible to select the correct distance and thus to calculate the distance with much higher accuracy.

In the above configuration, the distance measuring apparatus of the invention may further comprise a reception controller, that acquires information in a data section of the reflection signal, and outputs, to the outside, the distance information calculated by the distance calculator which is associated with the information in the data section.

In the above method, the distance measuring method of the invention may further comprise a reception control step of acquiring information in a data section of the reflection signal, and outputting, to the outside, the distance information calculated by the distance calculator which is associated with the information in the data section.

According to the above-mentioned configuration and method, the information in the data section included in the reflection signal gives information that identifies the reflector that transmitted the reflection signal, for instance. The reception controller identifies the distance information measured by the distance calculator and the information in the data section which are associated with each other. Accordingly, even when the distance measuring apparatus communicates with a plurality of reflectors, it becomes possible to distinguish the distances to the reflectors.

According to the distance measuring apparatus of the invention, in the above configuration, the distance calculator may measure a direction that the reflector that has transmitted the reflection signal is located, on the basis of the reflection signal.

According to the distance measuring method of the invention, in the above method, the distance calculating step may measure a direction that the reflector that has transmitted the reflection signal is located, on the basis of the reflection signal.

According to the above-mentioned configuration and method, it becomes possible to identify the direction of location where the reflector exists along with the distance to the reflector. Accordingly, it becomes possible to identify the location where the reflector exists.

According to the distance measuring apparatus of the invention, in the above configuration, the distance calculator may calculate the distance by analyzing a signal in a preamble section of the reflection signal.

According to the distance measuring method of the invention, in the above method, the distance calculating step may calculate the distance by analyzing a signal in a preamble section of the reflection signal.

According to the above-mentioned configuration and method, the distance is calculated by analyzing the signal in the preamble section of the reflection signal. Here, the preamble section represents the data indicating the start of the reflection signal and is composed of a prescribed data component that is common to all reflectors based on the same standard (EPC, for example). Therefore, the lengths of the preamble section are all the same for signals that are received from any reflectors, thus making it possible to perform the signal analysis in an assured manner. Because the signals in the preamble section are all the same, it becomes possible to calculate the distance even when the signals had been subjected to PSK modulation.

The respective members in the distance measuring apparatus of the invention may be realized by a computer. In this case, the invention may be realized by causing the computer to execute a program that operates the computer as the respective members.

A reflector according to the invention is characterized by comprising:

a signal generator, that generates a reflection signal, which is a signal composed of one frame, from a request signal transmitted from the distance measuring apparatus of the invention; and a frequency controller, that transmits the reflection signal generated by the signal generator via a plurality of different carrier frequencies.

According to the above-mentioned configuration, the reflection signal transmitted by the reflector is received by the distance measuring apparatus of the invention, thus making the distance measuring apparatus possible to calculate the distance with high precision and high accuracy.

According to the reflector of the invention, in the above configuration, the frequency controller may set a plurality of divided periods in a period for transmitting one request signal, and controls such that the different carrier frequencies are used for the respective divided periods.

According to the above-mentioned configuration, the distance can be calculated only by transmitting one reflection signal. Thus, it becomes possible to reduce the number of signal communications required for the distance calculation. Accordingly, it is possible to calculate the distance without deteriorating the communication efficiency.

According to the reflector of the invention, in the above configuration, the frequency controller may transmit the request signal via one of the carrier frequencies composed of different carrier frequency components.

According to the above-mentioned configuration, the distance can be calculated only by transmitting one reflection signal. Thus, it becomes possible to reduce the number of signal communications required for the distance calculation. Accordingly, it is possible to calculate the distance without deteriorating the communication efficiency.

A communication system according to the invention is characterized by comprising:

the distance measuring apparatus of the invention; and at least one reflector that performs wireless communication with the distance measuring apparatus.

According to the above-mentioned configuration, it becomes easy to construct a system for managing communication with reflectors and especially capable of understanding information about distance to the reflectors.

A communication system of the invention is characterized by comprising:

the distance measuring apparatus of the invention; and a management apparatus, that manages at least one of articles, people, and living things that are associated with the reflectors on the basis of a communication result between the distance measuring apparatus and the reflectors.

According to the above-mentioned configuration, it becomes easy to construct a system that manages articles, people, and living things that are associated with the reflectors and is capable of identifying information about the location thereof.

ADVANTAGE OF THE INVENTION

As described above, the distance measuring apparatus of the invention has a configuration in which the apparatus performs a processing of receiving a reflection signal transmitted from a reflector via a plurality of different carrier frequencies, and the apparatus is provided with a distance calculator that analyzes the reflection signal transmitted from the reflector to calculate the distance between the reflector and the distance measuring apparatus. With such a configuration, it becomes advantageous to calculate the distance between the reflector and the distance measuring apparatus with much higher precision.

The communication system of the invention has a configuration in which the system is provided with the distance measuring apparatus of the invention and one or more reflectors that perform a wireless communication with the distance measuring apparatus.

With such a configuration, it becomes easy and advantageous to construct a system that manages the communication with the reflectors and is at least capable of identifying information about the distance to the reflectors.

The communication system of the invention has a configuration in which the system is provided with the distance measuring apparatus of the invention and a management apparatus that manages at least one of articles, people, and living things that are associated with the reflectors on the basis of the results of communication between the distance measuring apparatus and the reflectors.

With such a configuration, it becomes easy and advantageous to construct a system that manages articles, people, and living things that are associated with the reflectors and is capable of identifying information about the location thereof.

BRIEF DESCRIPTION OF THE DRAWINGS

FIG. 3A is a diagram showing the state in which an R/W request signal and a tag response signal are communicated between the reader/writer and the RFID tag.

FIG. 3B is a diagram in which signals transmitted from the reader/writer to the RFID tag and carrier frequencies thereof are illustrated on time axis.

FIG. 3C is a diagram in which signals transmitted from the RFID tag to the reader/writer and carrier frequencies thereof are illustrated on time axis.

FIG. 12A is a diagram showing the case where frequencies are switched over within one frame, in which signals transmitted from the reader/writer to the RFID tag and carrier frequencies thereof are illustrated on time axis.

FIG. 12B is a diagram showing the case where frequencies are switched over within one frame, in which signals transmitted from the RFID tag to the reader/writer and carrier frequencies thereof are illustrated on time axis.

DESCRIPTION OF REFERENCE NUMERALS

1: RFID TAG
2: READER/WRITER
3: TRANSMITTER ANTENNA
4: RECEIVER ANTENNA
4A: FIRST ANTENNA ELEMENT
4B: SECOND ANTENNA ELEMENT
5: RECEPTION PROCESSOR
5A: PLL SECTION
5B: MODULATOR
5C: POWER AMPLIFIER
6: TRANSMISSION PROCESSOR
6A, 6A1, 6A2: AMPLIFIER
6B: FREQUENCY CONVERTER
6B1, 6B2: MIXER
6B3: 90-DEGREE PHASE SHIFTER
6C: PREAMBLE EXTRACTOR

6D: SELECTOR
7: COMMUNICATION CONTROLLER
7A: FREQUENCY CONTROLLER
7B: TRANSMISSION CONTROLLER
7C: RECEPTION CONTROLLER
8: LOCATION MEASURE
8A: PHASE INFORMATION ACQUIRER
8B: DISTANCE CALCULATOR
8C: DIRECTION CALCULATOR
9: EXTERNAL COMMUNICATOR
10: AREA DETERMINANT

BEST MODE FOR CARRYING OUT THE INVENTION

Hereinafter, one embodiment of the invention will be described below with reference to FIGS. 1 to 25.

Configuration of Reader/Writer

Figure 2:
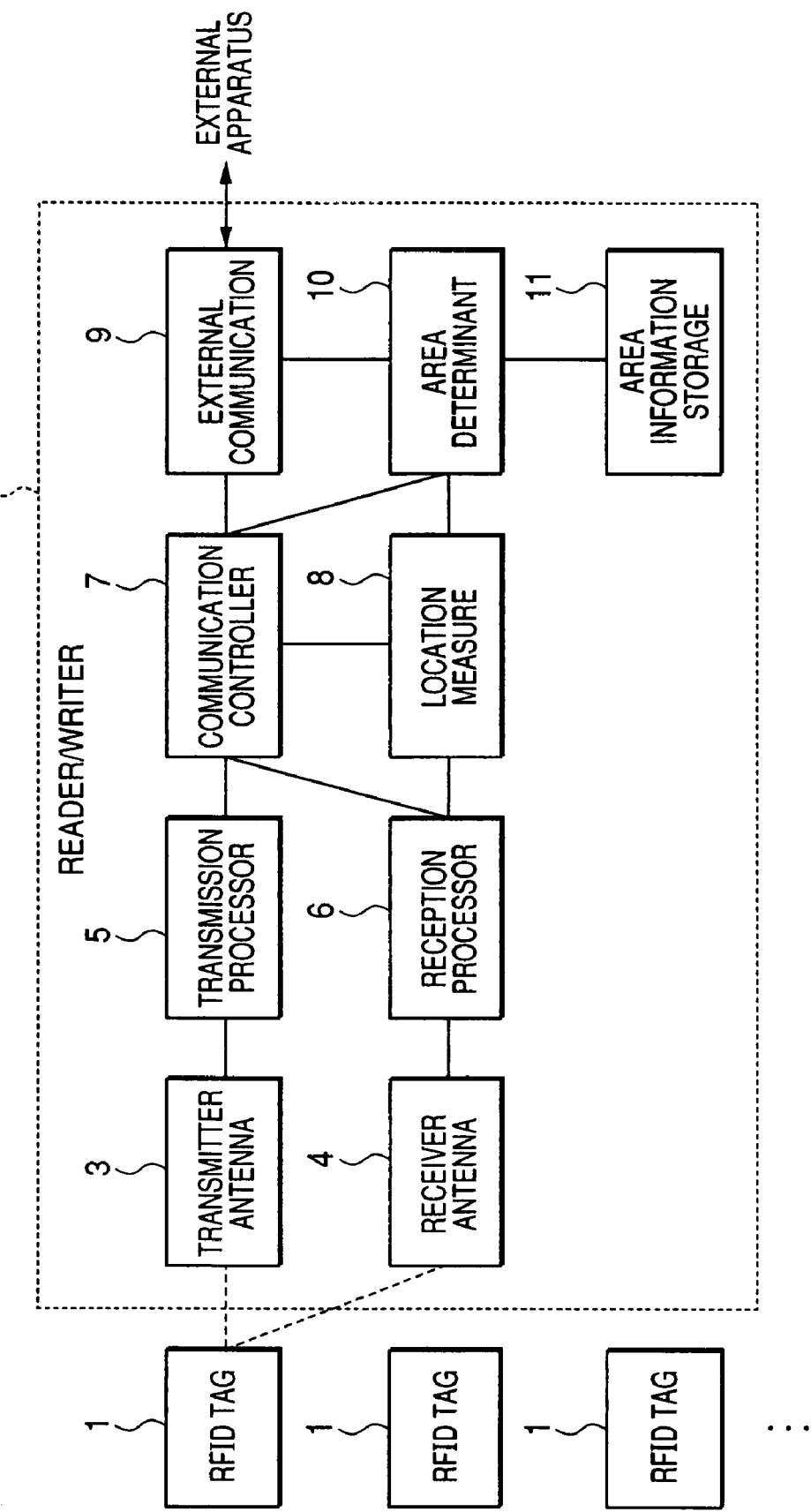
FIG. 2 is a simplified block diagram showing the configuration of the RFID tag communication system.

FIG. 2 shows a simplified block diagram of a communication system of the invention, including RFID tags and a reader/writer. As shown in the drawing, the communication system is configured to include one or more RFID tags (reflectors) 1 and a reader/writer (distance measuring apparatus) 2.

The RFID tag 1 is attached to various articles and stores information about the article attached or about objects or people associated therewith. The RFID tag 1 is configured to include an IC (Integrated Circuit) for wireless communication, a storage, and an antenna.

In the present embodiment, the RFID tag 1 used is considered as being a passive RFID tag that does not have a power source such as battery, operates circuits by drawing energy from radio waves transmitted from the reader/writer 2, thus performing wireless communication with the reader/writer 2. The RFID tag that is usable in the present embodiment is not limited to the passive RFID tag, but an active RFID tag that has a power source such as battery may be used.

The reader/writer 2 is a device that performs wireless communication with each of the RFID tags 1 and reads/writes information from/into the RFID tags 1. In the present embodiment, the reader/writer 2 is configured to read/write information from/into the RFID tags 1. However, the invention is not limited to this, and the reader/writer 2 may be configured only to read information from the RFID tags 1.

In the present embodiment, the frequency band of the radio wave transmitted by the reader/writer 2 is in the so-called UHF band that is somewhere between 800 MHz and 960 MHz. By using the radio wave in such a frequency band, the reader/writer 2 becomes able to communication with the RFID tag 1 that is located in a distance range of from several meters to several ten meters. Although the present embodiment is considering a UHF band communication, the invention is not limited to this. As a frequency band that is usable exclusively for RFID tag, frequency bands such as 13.56 MHz band or 2.45 GHz band are available. Additionally, the communication may be made using other frequency bands as long as wireless communication can be performed in that frequency bands.

The reader/writer 2 is configured to include a transmitter antenna 3, a receiver antenna 4, a transmission processor 5, a reception processor 6, a communication controller 7, a location measure 8, an external communicator 9, an area determinant 10, and an area information storage 11.

The transmitter antenna 3 is an antenna that transmits radio waves to the RFID tags 1, and the receiver antenna 4 is an antenna that receives radio waves sent back from the RFID tags 1. The transmitter antenna 3 and the receiver antenna 4 are configured, for example, as a patch antenna or an array antenna. Although in the present configuration example, the transmitter antenna 3 and the receiver antenna 4 are separately provided, a single antenna may be used in which functions of both the transmitter antenna 3 and the receiver antenna 4 are integrated into the antenna.

The transmission processor 5 is a block that performs processes such as modulation or amplification to the transmission signal to be transmitted from the transmitter antenna 3. The reception processor 6 is a block that performs processes such as amplification or demodulation to the reception signals received by the receiver antenna 4.

The communication controller 7 is a block that performs a control of reading and/or writing information from or to the RFID tag 1 for communication through the transmitter antenna 3 and/or the receiver antenna 4.

The location measure 8 is a block that measures the location of the RFID tag 1 on the basis of the reception signals received from the RFID tag 1. The measurement of the location of the RFID tag 1 includes measurement of the distance between the reader/writer 2 and the RFID tag 1; measurement of the direction of the RFID tag 1 as seen from the reader/writer 2; and measurement of the spatial location of the RFID tag 1, which will be described in detail later. Strictly speaking, the distance between the reader/writer 2 and the RFID tag 1 corresponds to an additive average of two distances: the distance between the transmitter antenna 3 of the reader/writer 2 and the RFID tag 1; and the distance between the receiver antenna 4 of the reader/writer 2 and the RFID tag 1. Here, if the RFID tag 1 is an active one, the distance corresponds to the distance between the receiver antenna 4 and the RFID tag 1.

The area determinant 10 is a block that determines whether the RFID tag 1 is located within a prescribed spatial area (communication area) on the basis of the location measured by the location measure 8. Area information about which spatial area is located the communication area is stored in the area information storage 11. The area determinant 10 determines whether the RFID tag 1 exists within the communication area by determining whether the location measured by the location measure 8 exists within the communication area as prescribed by the area information.

The external communicator 9 is a block that transmits information about the RFID tag 1 read by the reader/writer 2 to an external apparatus or receives information to be written into the RFID tag 1 from the external apparatus. The external apparatus and the external communicator 9 are communicably connected to each other in a wired or wireless manner. In this case, the external apparatus that operates on the basis of operations of the reader/writer 2 reading and/or writing information from or into the RFID tag 1 may be configured to include the reader/writer 2.

The area information stored in the area information storage 11 is set depending on the environment in which the reader/writer 2 is installed. The area information may be set by the external apparatus through the external communicator 9, for example. A user interface for inputting the area information may be provided to the reader/writer 2.

Components of the reader/writer 2, that is, the communication controller 7, the location measure 8, the area determinant 10, and the external communicator 9 may be configured as a hardware logic, or may be configured to be realized by a processor, such as CPU, executing programs stored in a storage such as ROM (Read Only Memory) or RAM.

When the above-mentioned configuration are configured by the processor such as CPU and the storage, a computer equipped with these means reads out the program from a recording medium and executes the program, whereby various functions and various operations of the communication controller 7, the location measure 8, the area determinant 10, and the external communicator 9 are realized. Additionally, by recording the program into a removable recording medium, the various functions and the various operations can be realized on an arbitrary computer.

The recording medium may be a memory (not shown), for example, a program medium such as ROM in which a program for execution on a computer is recorded. Alternatively, the recording medium may be a program medium that is readable when being inserted into a program reading device (not shown) that is provided as an external storage device.

In any cases, the program stored is preferably one which can be accessed and executed by a microprocessor. Preferably, the program is read out, and the read-out program is downloaded for execution to a program memory area of a microcomputer. In this case, it is assumed that the program for downloading is prestored in a main apparatus.

If the system is configured to be able to connect to a communication network including the Internet, the recording medium is preferably one which actively downloads a program from the communication network and stores the program therein.

In the case of downloading the program from the communication network, the download program is preferably prestored in the main apparatus, and alternatively the download program may be installed from other recording medium.

Configuration Related to Distance Measurement

Next, the configuration of the reader/writer 2, especially for measuring the distance between the RFID tag 1 and the reader/writer 2 will be described with reference to FIG. 1. As shown in the drawing, the transmission processor 5 includes a PLL (Phase Locked Loop) section 5A as a frequency adjuster, a modulator 5B, a power amplifier 5C, and a transmitter 5D. The reception processor 6 includes an amplifier 6A and a frequency converter 6B. The location measure 8 includes a phase information acquirer 8A and a distance calculator 8B. The communication controller 7 includes a frequency controller 7A, a transmission controller 7B, and a reception controller 7C.

In the transmission controller 5, the PLL section 5A is a block that sets a carrier frequencies of a transmission signal to be transmitted from the transmitter antenna 3, and the PLL section 5A is configured by a PLL circuit. The modulator 5B modulates carrier signals generated by the PLL section 5A and the transmitter 5D to superimpose data to the transmission signal. In the present embodiment, the modulator 5B generates the transmission signal through ASK (Amplitude Shift Keying) modulation. A modulation method of the transmission signal is not limited to the ASK modulation, but FSK (Frequency Shift Keying) modulation, PSK (Phase Shift Keying) modulation, or other digital modulation methods may be used. The power amplifier 5C is a block that amplifies the transmission signal.

In the reception processor 6, the amplifier 5A is a block that amplifies the reception signals received by the receiver antenna 4. The frequency converter 6B is a block that converts the frequency of the reception signals amplified by the amplifier 6A into a lower frequency signal.

In the location measure 8, the phase information acquirer 8A is a block that detects the amount of phase change in the reception signals that is frequency-converted by the frequency converter 6B and acquires the phase change amount as phase information. Here, the phase change amount of the reception signals is the amount of phase change produced when the reception signals propagates a prescribed distance.

More specifically, when the carrier signal outputted from the PLL section 5A is expressed as $\sin 2\pi f_1 t$, the frequency converter 6B multiplies the carrier signal $\sin 2\pi f_1 t$ with the reception signals $D(t)A \sin(2\pi f_1 t + \phi)$ inputted from the amplifier 6A and passes a multiplication result value $D(t)A \cos \phi$ to the phase information acquirer 8A. The phase information acquirer 8A calculates the phase change amount $\phi$ on the basis of the value passed from the frequency converter 6B. In the above formula, t is a time; D(t) is a baseband signal when the modulator 5B performs ASK modulation; A is an amplitude of the carrier signal itself; $\phi$ is the phase change amount when propagating a round-trip distance of 2r.

The distance calculator 8B is a block that calculates the distance between the RFID tag 1 and the reader/writer 2 on the basis of information about the phase change amount acquired by the phase information acquirer 8A.

In the communication controller, the frequency controller 7A is a block that controls the frequency of the transmission signal that is set by the PLL section 5A. The transmission controller 7B is a block that inputs data used to modulate the transmission signal to the modulator 5B. The reception controller 7C is a block that allows the communication controller 7b to receive information about the distance calculated by the distance calculator 8B.

Details of Distance Measurement

Next, details of the distance measurement processing will be described. In the present embodiment, the reader/writer 2 is configured to transmit an R/W request signal (request signal) to the RFID tag 1, and the RFID tag 1 is configured to reply a response signal (reflection signals) with respect to the request signal. Such a procedure is illustrated in FIGS. 3A to 3C. FIG. 3A is a diagram showing the state in which the R/W request signal and the response signal are communicated between the reader/writer and the RFID tag. FIG. 3B is a diagram in which signals transmitted from the reader/writer to the RFID tag and carrier frequencies thereof are illustrated on time axis. FIG. 3C is a diagram in which signals transmitted from the RFID tag to the reader/writer and carrier frequencies thereof are illustrated on time axis.

The reader/writer 2 is always transmitting a specific signal (signal for powering the RFID tag 1). When requesting the RFID tag 1 to transmit the response signal (hereinafter will be referred to as a tag response signal), as shown in FIG. 3B, the reader/writer 2 transmits the R/W request signal that requests a reply of the tag response signal. That is, in a normal state, the transmission controller 7B of the reader/writer 2 controls the modulator 5B to transmit data indicative of the normal state. When requesting the tag response signal, the reader/writer 2 controls the modulator 5B to transmit data that constitutes the R/W request signal. The RFID tag 1 is always monitoring the signals sent from the reader/writer 2. When detecting reception of the R/W request signal, the RFID tag 1 transmits the tag response signal in the form of responding to the R/W request signal.

More specifically, the reader/writer 2 transmits a one-frame signal composed of the R/W request signal and a CW (continuous carrier wave). When receiving the R/W request signal and the CW (continuous carrier wave) from the reader/writer 2, the RFID tag 1 transmits the tag response signal via a carrier frequencies $f_1$ corresponding to the frequency of the CW (continuous carrier wave) to the reader/writer 2. In FIGS. 3B and 3C, the R/W request signal and the CW (continuous carrier wave) are transmitted via the carrier frequencies $f_1$, and accordingly, the tag response signal is transmitted via the carrier frequencies $f_1$.

The tag response signal is constituted by a preamble section and a data section, as illustrated in FIG. 3C. Here, the preamble section represents the data indicating the start of the reflection signals, and is composed of a prescribed data component that is common to all reflectors based on the same standard (EPC, for example). The data section is transmitted following the preamble section and represents the data indicating substantial information that is transmitted from the RFID tag 1. As information included in the data section, ID information that is unique to each of the RFID tags 1 can be exemplified. Also, information that should be transmitted from the RFID tag 1, for example various information that is stored in the storage of the RFID tag 1 may be included in the data section.

The reader/writer 2 transmits the R/W request signal twice and uses different carrier frequencies in each transmission of the R/W request signal (more specifically, the CW (continuous carrier wave) following the R/W request signal). That is, in the first transmission of the R/W request signal, the frequency controller 7A of the reader/writer 2 controls the PLL section 5A to output the carrier signal using a first frequency $f_1$. Meanwhile, in the second transmission of the R/W request signal, the frequency controller 7A controls the PLL section 5A to output the carrier signal using a second frequency $f_2$ that is different from the first frequency $f_1$.

Figure 1:
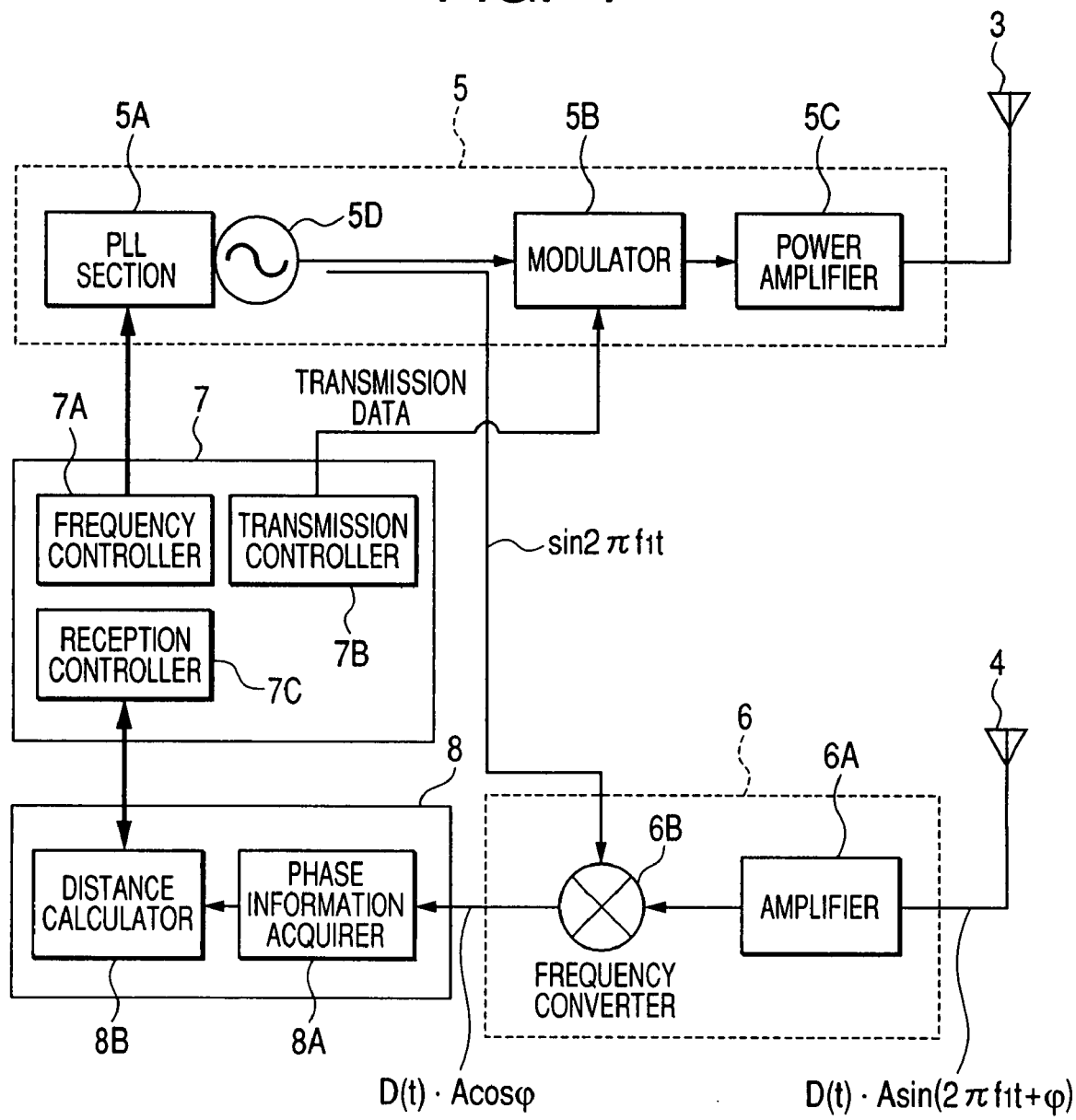
FIG. 1 is a simplified block diagram of a reader/writer of an RFID tag communication system according to the invention, showing the configuration for measuring the distance between the reader/writer and the RFID tag.

As shown in FIGS. 1, 3B and 3C, when the RFID tag 1 receives the R/W request signal transmitted via the first frequency $f_1$, the tag response signal is replied using the first frequency $f_1$. In the reader/writer 2, the phase information acquirer 8A analyzes the preamble section of the received tag response signal to detect $\phi_1$ that indicates the phase change amount of the tag response signal. Similarly, when the RFID tag 1 receives the R/W request signal transmitted via the first frequency $f_2$, the tag response signal is replied using the first frequency $f_2$. In the reader/writer 2, the phase information acquirer 8A analyzes the preamble section of the received tag response signal to detect $\phi_2$ that indicates the phase change amount of the tag response signal.

In the above example, the phase change amount of the tag response signal is detected by analyzing the preamble section. However, the invention is not limited to this. The phase change amount may be detected while taking the data section into consideration. Also, the phase change amount may be detected for the data section. However, in the case of the PSK modulation, it is difficult to detect the phase change amount that depends on distance on the basis of the data section having variable contents. Thus, it is preferable to detect the phase change amount in the preamble section having fixed contents.

In this manner, when the phase information acquirer 8A detects the phase change amounts $\phi_1$ and $\phi_2$, information about the phase change amounts is transferred to the distance calculator 8B. The distance calculator 8B calculates the distance between the RFID tag 1 and the reader/writer 2 on the basis of $\phi_1$ and $\phi_2$ in the following manner.

First, assuming the distance between the transmitter antenna 3 and the RFID tag 1 is equal to the distance between the receiver antenna 4 and the RFID tag 1, the distance is defined as r. The phase change amounts $\phi_1$ and $\phi_2$ that are produced when the carrier signals of the first frequency $f_1$ and the second frequency $f_2$ propagate round-trip distance of 2r can be expressed by the following formulas.

$$\phi_1 = \frac{2\pi f_1}{c} 2r \qquad \text{[Formula 1]}$$

$$\phi_2 = \frac{2\pi f_2}{c} 2r$$

In the above formulas, c represents the velocity of light. On the basis of the above two formulas, the distance r can be calculated by the following formula.

$$r = \frac{c\Delta\phi}{4\pi|f_1 - f_2|} \qquad \text{[Formula 2]}$$

In this manner, on the basis of the phase change amount $\phi_1$ and $\phi_2$, it is possible to calculate the distance r between the transmitter antenna 3 and the RFID tag 1. Here, it can be expected that a phase shift may occur at the RFID tag 1 during the period between reception of the R/W request signal and transmission of the tag response signal. However, the carrier signals of the first frequency $f_1$ and the second frequency $f_2$ experience the same amount of the phase shift. Therefore, the phase shift produced in the RFID tag 1 when communicating signals does not influence the distance calculation.

In Formula 2, if $\phi_2$ is equal to or greater than $2\pi$, it is difficult to calculate the distance r with high accuracy. In other words, a maximum measurable value $r_{max}$ of the distance r is obtained when $\Delta\phi=2\pi$, which can be expressed by the following formula.

$$r_{max} = \frac{c}{2|f_1 - f_2|} \qquad \text{[Formula 3]}$$

For example, if the difference between the first frequency $f_1$ and the second frequency $f_2$ is set to 5 MHz, the maximum distance $r_{max}$ becomes 30 meters from Formula 3. Similarly, if the difference between the first frequency $f_1$ and the second frequency $f_2$ is set to 2 MHz, the maximum distance $r_{max}$ becomes 75 meters from Formula 3. Since the RFID communication system using UHF band is considering the use of a maximum communicable distance of about 10 meters, such a measurement will not cause any problems in practical use.

When it is required to measure a distance greater than the maximum distance $r_{max}$, the measurement of the distance r may be performed in conjunction with the measurement of a reception intensity of the reception signals, for example. Specifically, if there is a possibility that $\Delta\phi$ becomes greater than $2\pi$, a candidate r' of the distance r can be expressed as r'=r+ $n \cdot r_{max}$ (n is an integer of 0 or more). Accordingly, by using the fact that the reception intensity of the reception signals decreases as the distance increases, it becomes possible to determine the value of n.

In the case of using the active RFID tag, the reader/writer 2 does not transmit the R/W request signal, and thus the distance measurement may be performed on the basis of the tag response signal that is actively transmitted from the RFID tag.

Specific Example of Reception Processor

In the distance measurement described above, a processing of detecting the phase change amount of the reception signals is performed. Detailed configuration of the reception processor 6 that enables the detection of the phase change amount will be described with reference to FIG. 4. In this specific example, the reception processor 6 separates the reception signals into an I signal and a Q signal and inputs the I and Q signals to the location measure 8, thereby enabling the location measure 8 to perform the processing of detecting the phase change amount. As shown in the drawing, the reception processor 6 includes two amplifiers 6A1 and 6A2 as the amplifier 6A, two mixers 6B1 and 6B2 as the frequency converter 6B, and a 90-degree phase shifter 6B3.

The reception signals received by the receiver antenna 4 is branched into two paths: one is input to the amplifier 6A1; and the other is input to the amplifier 6A2. The amplifier 6A1 amplifies the input reception signals and inputs the signal to the mixer 6B1. The amplifier 6A2 amplifies the input reception signals and inputs the signal to the mixer 6B2.

The mixer 6BG1 multiplies the reception signals inputted from the amplifier 6A1 with the carrier signal outputted from the PLL section 5A to obtain the I signal and inputs the I signal to the phase information acquirer 8A. The mixer 6B2 multiplies the reception signals inputted from the amplifier 6A2 with the carrier signal that is outputted from the PLL section 5A and 90-degree phase-shifted by the 90-degree phase shifter 6B3 to obtain the Q signal and inputs the Q signal to the phase information acquirer 8A.

Hereinafter, details of the reception processing and the processing of calculating the distance r which are performed by the above configuration will be described.

Assuming the frequency of the carrier signal is $f_1$, the signal received at the reader/writer 2 after propagating round-trip distance of 2r can be expressed by the following formula.

$$s_1(t) = D(t) A \sin(2\pi f_1 t + \phi_1) \quad \text{[Formula 4]}$$

In the above formula, t is a time; $s_1(t)$ is a signal state that is transmitted through the carrier signal of a frequency $f_1$; $D(t)$ is a baseband signal when the modulator 5B performs ASK modulation; A is an amplitude of the carrier signal itself; $\phi_1$ is the phase change amount when propagating a round-trip distance of 2r. In this case, $I1(t)$ that represents the signal state of the I signal outputted from the mixer 6B1 and $Q1(t)$ that represents the signal state of the Q signal outputted from the mixer 6B2 can be expressed by the flowing formulas.

$$I_1(t) = D(t) A \sin(2\pi f_1 t + \phi_1) \sin 2\pi f_1 t \Rightarrow D(t) A \cos \phi_1 \quad \text{[Formula 5]}$$

$$Q_1(t) = D(t) A \sin(2\pi f_1 t + \phi_1) \cos 2\pi f_1 t \Rightarrow D(t) A \sin \phi_1 \quad \text{[Formula 6]}$$

From the above formulas, and on the basis of the I signal and the Q signal, the phase change amount $\phi_1$ attributable to the carrier signal of the frequency $f_1$ can be calculated by the following formula.

$$\phi_1 = \tan^{-1} \frac{Q_1(t)}{I_1(t)} \quad \text{[Formula 7]}$$

Similarly, the phase change amount $\phi_2$ attributable to the carrier signal of the frequency $f_2$ can be calculated by the following formula.

$$\phi_2 = \tan^{-1} \frac{Q_2(t)}{I_2(t)} \quad \text{[Formula 8]}$$

In this manner, the phase information acquirer 8A acquires the phase change amounts $\phi_1$ and $\phi_2$ on the basis of the input I and Q signals. Then, the distance calculator 8B calculates the distance r from the following formula.

$$r = \frac{c \Delta \phi}{4\pi |f_1 - f_2|} \quad \text{[Formula 9]}$$

$$\Theta \Delta \phi = \phi_1 - \phi_2$$

Procedures in Distance Measurement Processing

Figure 5:
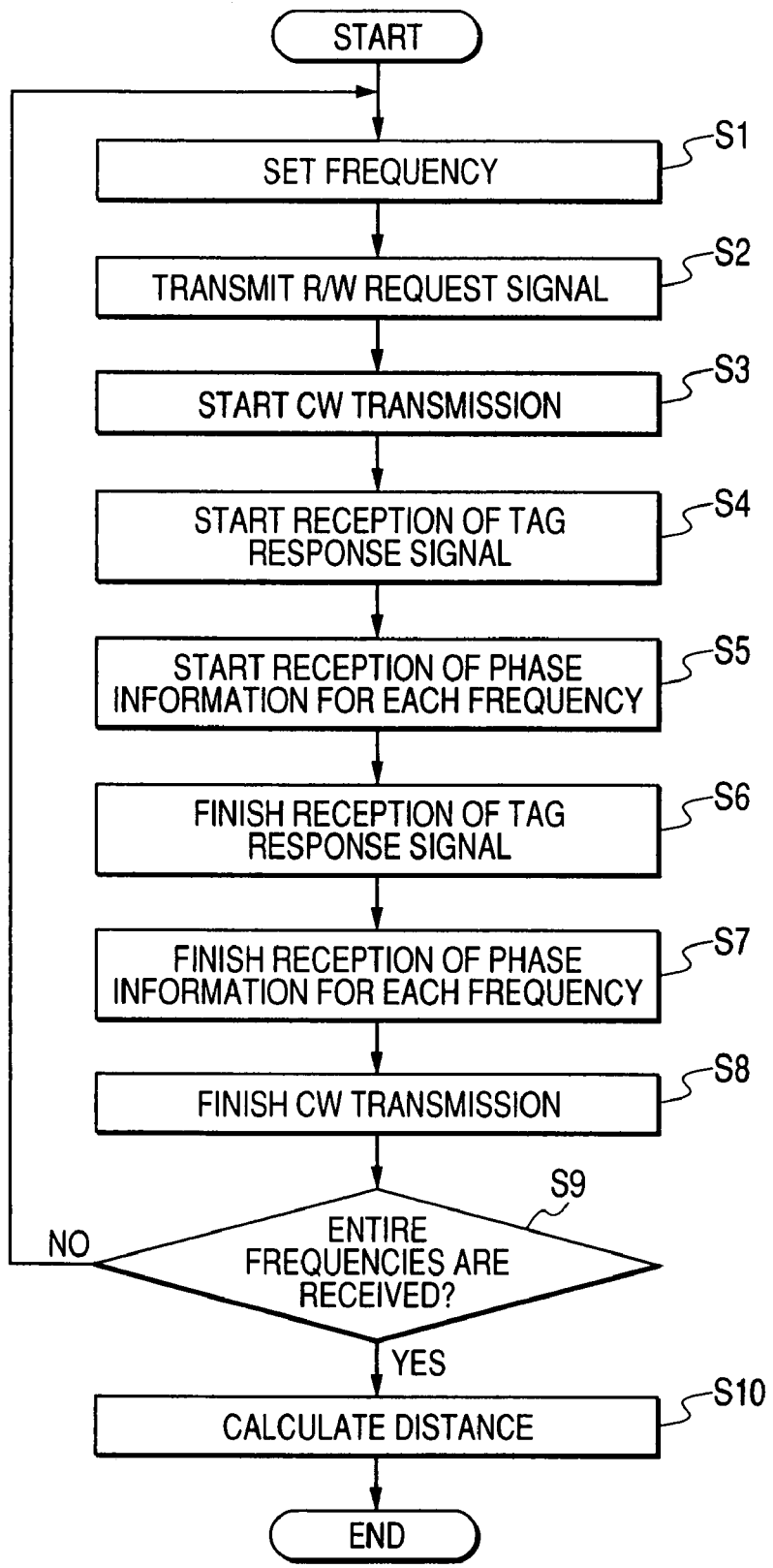
FIG. 5 is a flowchart showing the procedures of a distance measurement processing.

Next, the procedure of the distance measurement processing in the reader/writer 2 will be described with reference to the flowchart of FIG. 5.

First, when the distance measurement processing is started, in Step 1 (hereinafter will be referred to as S1), the frequency controller 7A controls the PLL section 5A to adjust the frequency of the carrier signal used to transmit the R/W request signal so as to become the first frequency $f_1$.

Next, the transmission controller 7B controls the modulator 5B to superimpose the data representing the R/W request signal to the carrier signal. The transmission signal modulated by the modulator 5B is amplified by the power amplifier 5C and is then outputted from the transmitter antenna 3 (S2). Following the transmission of the R/W request signal, the CW (continuous carrier wave) is transmitted via the first frequency $f_1$ (S3).

When detecting the R/W request signal, the RFID tag 1 transmits, as a reply, the tag response signal via a carrier frequencies corresponding to the first frequency $f_1$ of the CW (continuous carrier wave) that is detected subsequent to the R/W request signal. When the tag response signal is received by the receiver antenna 4, the reception processor 6 performs a reception processing to the tag response signal (S4); and the phase information acquirer 8A performs a phase information acquiring processing (S5).

That is, in the reception processor 6, on the basis of Formula 4 to 6, the frequency converter 6B calculates the I signal and the Q signal by multiplying the reception signals inputted from the amplifier 6A and the carrier signal outputted from the PLL section 5A. When acquiring the I signal and the Q signal from the frequency converter 6B, on the basis of Formula 7 and 8, the phase information acquirer 8A calculates the phase change amounts $\phi_1$ and $\phi_2$ attributable to the first frequency $f_1$ and stores the amounts and the frequency (first frequency $f_1$) used as the carrier signal in a table in a correlated manner.

When the reception processor 6 finishes the reception of the tag response signal from the RFID tag 1 (S6), the phase information acquirer 8A finishes the phase information acquiring processing (S7). Thereafter, the transmission processor 5 finishes the transmission of the CW (continuous carrier wave), that is, the transmission of the one-frame signal (S8). The reception controller 7C determines whether the reception signals has been received for the entire frequencies. If it is determined that the reception signals has not been received for the entire frequencies (NO in S9), the procedure goes back to the processing of S1. In the above example, the first and second frequencies $f_1$ and $f_2$ are used as a frequency of the reception signals. Therefore, the reception controller 7C determines whether the reception signals has been received for both of the first and the second frequencies $f_1$ and $f_2$.

At this moment, since the reception signals is received only for the first frequency $f_1$, the procedure goes back to the processing of S1. When the processing of S1 is performed again, the frequency controller 7A controls the PLL section 5A to adjust the frequency of the carrier signal (and the CW (continuous carrier wave)) used to transmit the R/W request signal so as to become the first frequency $f_2$. Thereafter, processes of S2 to S8 are performed. If it is determined that the reception signals has been received for the entire frequencies (YES in S9), the procedure goes to the processing of S10.

In S10, on the basis of the phase information acquired, the distance calculator 8B calculates the distance between the RFID tag 1 and the reader/writer 2 in accordance with the above-described methods. More specifically, the distance calculator 8B extracts the phase change amount for each frequency from the table and calculates the distance r on the basis of Formula 9 described above. The distance information calculated is transferred to the reception controller 7C. In this manner, the distance measurement processing is completed.

Distance Measurement with Multiple Frequencies

In the above example, the distance is measured on the basis of the reception signals of two different frequencies. However, as described later, the distance may be measured on the basis of the reception signals of three or more different frequencies.

When signals are communicated between the reader/writer 2 and the RFID tag 1, the signal transmitted from the reader/writer 2 directly arrives at the RFID tag 1 and the signal transmitted from the RFID tag 1 directly arrives at the reader/writer 2. However, the case may be considered in which the signal does not directly arrive at the reader/writer 2 and the RFID tag 1 but arrives at them after being reflected from nearby objects (multiple paths). In this case, since the reception signals received at the reader/writer 2 is influenced by the multiple paths, noise components can be mixed into the original phase state, thus deteriorating the S/N characteristics. That is, in the method of calculating the distance on the basis of phase information, the precision of the phase information acquired may be degraded, thus deteriorating the precision of the distance calculated.

In the above example, the method of separating the reception signals into the I signal and the Q signal and detecting the phase change amount on the basis of the I and Q signals has been described. However, depending on the phase states, either one of the I signal and the Q signal may have an extremely smaller signal level than the other one. In this case, measurement error attributable to the smaller signal can greatly influence the calculation of phase. That is, when either one of the I signal and the Q signal becomes extremely smaller than the other one, the phase measurement error increases, thus deteriorating the precision of the distance calculated.

The above problem can be solved by the following processes. First, the reader/writer 2 transmits the R/W request signal via three or more different frequencies and receives the tag response signal for each frequency. Then, among the reception signals, two reception signals of which the S/N ratio and the signal level of the I and Q signals are higher than those of other reception signals are selected, and the detection of the phase change amount and the location calculation are performed on the basis of the two reception signals selected.

Procedures of Distance Measurement Processing with Multiple Frequencies

Figure 6:
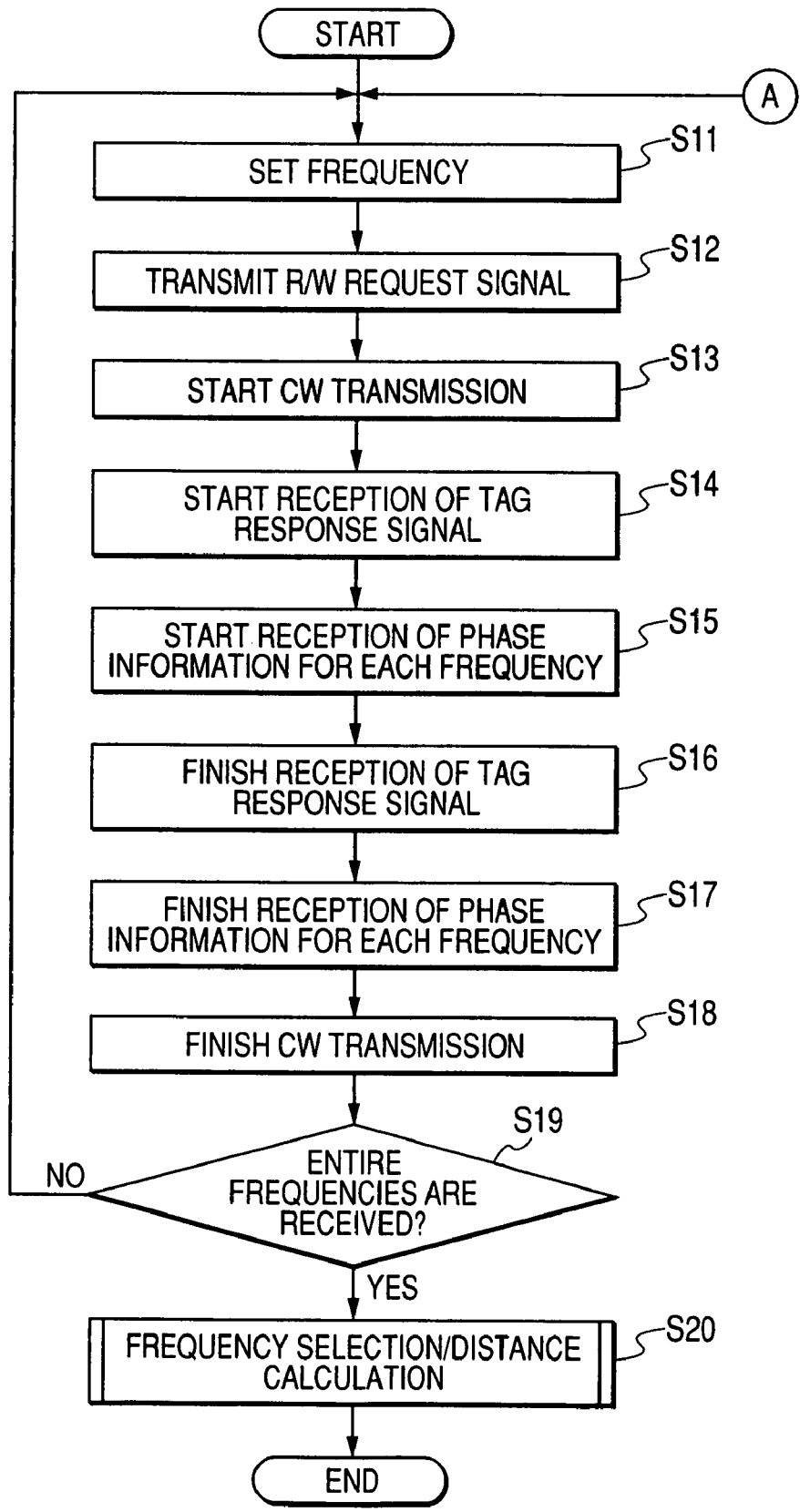
FIG. 6 is a flowchart showing the procedures of the distance measurement processing based on multiple frequencies.

Next, the procedure of the distance measurement processing with multiple frequencies in the reader/writer 2 will be described with reference to the flowchart of FIG. 6.

First, when the distance measurement processing is started, in S11, the frequency controller 7A controls the PLL section 5A to adjust the frequency of the carrier signal used to transmit the R/W request signal so as to become the first frequency $f_1$.

Next, the transmission controller 7B controls the modulator 5B to superimpose the data representing the R/W request signal to the carrier signal. The transmission signal modulated by the modulator 5B is amplified by the power amplifier 5C and is then outputted from the transmitter antenna 3 (S12). Following the transmission of the R/W request signal, the CW (continuous carrier wave) is transmitted via the first frequency $f_1$ (S13).

When detecting the R/W request signal, the RFID tag 1 transmits, as a reply, the tag response signal via a carrier frequencies corresponding to the first frequency $f_1$ of the CW (continuous carrier wave) that is detected subsequent to the R/W request signal. When the tag response signal is received by the receiver antenna 4, the reception processor 6 performs a reception processing to the tag response signal (S14); and the phase information acquirer 8A performs a phase information acquiring processing (S15).

That is, in the reception processor 6, on the basis of Formula 4 to 6, the frequency converter 6B calculates the I signal and the Q signal by multiplying the reception signals inputted from the amplifier 6A and the carrier signal outputted from the PLL section 5A. When acquiring the I signal and the Q signal from the frequency converter 6B, on the basis of Formula 7 and 8, the phase information acquirer 8A calculates the phase change amounts $\phi_1$ and $\phi_2$ attributable to the first frequency $f_1$ and derives the signal level s(t) on the basis of Formula 10 described later. Then, the phase information acquirer 8A stores the calculated phase change amounts and the frequency (first frequency $f_1$) used as the carrier signal in a table in a correlated manner.

$$s(t)=\sqrt{I(t)^2+Q(t)^2}$$ [Formula 10]

When the reception processor 6 finishes the reception of the tag response signal from the RFID tag 1 (S16), the phase information acquirer 8A finishes the phase information acquiring processing (S17). Thereafter, the transmission processor 5 finishes the transmission of the CW (continuous carrier wave), that is, the transmission of the one-frame signal (S18). The reception controller 7C determines whether the reception signals has been received for the entire frequencies (S19). If it is determined that the reception signals has not been received for the entire frequencies, the procedure goes back to the processing of S11. In this case, assuming the first to fourth frequencies are used as a frequency of the reception signals, the reception controller 7C determines whether the reception signals has been received for the entire, first to fourth frequencies.

At this moment, since the reception signals is received only for the first frequency $f_1$, the procedure goes back to the processing of S11. When the processing of S11 is performed again, the frequency controller 7A controls the PLL section 5A to adjust the frequency of the carrier signal (and the CW (continuous carrier wave)) used to transmit the R/W request signal so as to become the first frequency $f_2$. Thereafter, processes of S12 to S18 are repeated until the reception of the reception signals is confirmed for the fourth frequency $f_4$. If it is determined in S19 that the reception signals has been received for the entire frequencies, the procedure goes to the processing of S20.

In S20, the frequency selection processing is performed by the phase information acquirer 8A; and the distance calculation processing is performed by the distance calculator 8B, thereby finishing the distance measurement processing.

Figure 7:
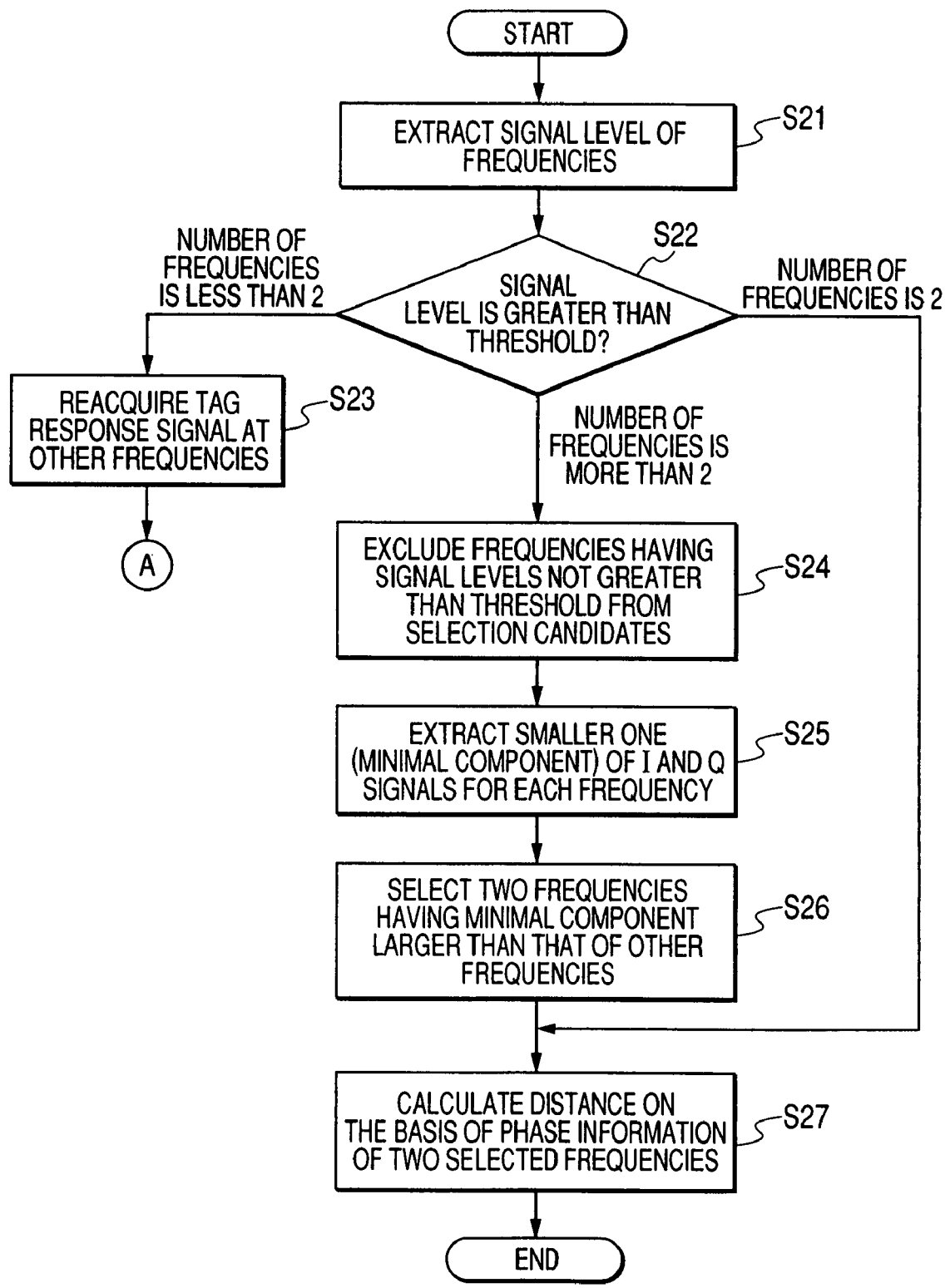
FIG. 7 is a flowchart showing the procedures of a frequency selection processing and a distance calculation processing.

Next, the procedure of the frequency selection processing in S20 in the phase information acquirer 8A and the procedure of the distance calculation processing in S20 in the distance calculator 8B will be described with reference to the flowchart of FIG. 7.

First, in S21, the phase information acquirer 8A acquires the signal level of the reception signals for the entire frequencies received from the table.

Next, in S22, the phase information acquirer 8A determines whether the signal level of the reception signals for each frequency is greater than a prescribed threshold. The prescribed threshold is preset as small as possible so as to provide sufficient precision to the distance calculation. The phase information acquirer 8A determines whether the number of frequencies of the reception signals that are greater than the prescribed threshold is less than 2; more than 2; or 2.

If the number of frequencies of the reception signals that are greater than the prescribed threshold is less than 2, in S23, the phase information acquirer 8A instructs the communication controller 7 to transmit the R/W request signal via other frequencies in order to reacquire the reception signals at other frequencies.

If the number of frequencies of the reception signals that are greater than the prescribed threshold is more than 2, first, in S24, the phase information acquirer 8A removes the frequencies of the reception signals that are not greater than the prescribed threshold from selection candidates. Next, in S25, the phase information acquirer 8A extracts, for each of the frequencies of the reception signals that are left as the selection candidate, one of the I signal and the Q signal that has the smaller signal level, and uses the smaller one as a minimal component. Thereafter, in S25, the phase information acquirer 8A selects two minimal components of which the signal level is greater than that of other minimal components of other frequencies. For the reception signals of the frequency corresponding to the two selected minimal components, the phase information acquirer 8A acquires the phase information from the table and transfers the information to the distance calculator 8B. In S27, the distance calculator 8B performs the distance calculation processing on the basis of the phase information received.

Meanwhile, if the number of frequencies of the reception signals that are greater than the prescribed threshold is 2, the phase information acquirer 8A acquires the phase information of the two reception signals and transfers the information to the distance calculator 8B. In S27, the distance calculator 8B performs the distance calculation processing on the basis of the phase information received.

Figure 8:
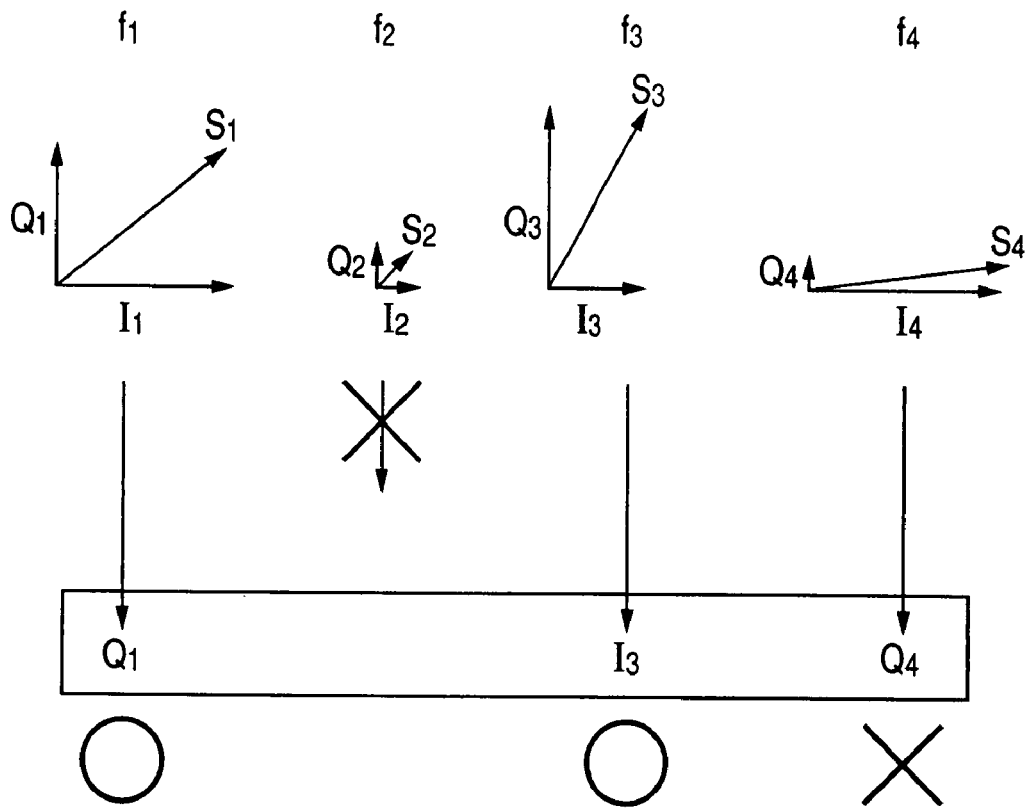
FIG. 8 is a schematic diagram showing an example of the frequency selection processing.

FIG. 8 schematically shows an example of the frequency selection processing. In this example, the case is considered in which the reception signals is received via frequencies $f_1$ to $f_4$. In the case of the reception signals of frequency $f_1$, the I signal component is represented by $I_1$; the Q signal component is represented by $Q_1$; and the reception signals level is represented by $S_1$. In the case of the reception signals of frequency $f_2$, the I signal component is represented by $I_2$; the Q signal component is represented by $Q_2$; and the reception signals level is represented by $S_2$. In the case of the reception signals of frequency $f_3$, the I signal component is represented by $I_3$; the Q signal component is represented by $Q_3$; and the reception signals level is represented by $S_3$. In the case of the reception signals of frequency $f_4$, the I signal component is represented by $I_4$; the Q signal component is represented by $Q_4$; and the reception signals level is represented by $S_4$.

First, in S22, among the signal levels $S_1$ to $S_4$, it is determined that $S_2$ is smaller than the prescribed threshold. Thus, in S24, the reception signals of frequency $f_2$ is removed from the selection candidates. Next, in S25, $Q_1$, $I_3$, and $Q_4$ are selected as the minimal component for frequencies $f_1$, $f_3$, and $f_4$, respectively. In S25, among $Q_1$, $I_3$, and $Q_4$, $Q_1$ and $I_3$ that have greater signal level are selected, and thus the reception signals of frequencies $f_1$ and $f_3$ are selected.

Through the above processes, it becomes possible to select the reception signals of two frequencies for use in the distance calculation while excluding, from consideration, the reception signals that has deteriorated S/N characteristics by being influenced by the multiple paths and the reception signals in which either one of the I signal and the Q signal has an extremely smaller signal level that the other one. Accordingly, it becomes possible to maintain the precision of the distance calculation at a high level under any circumstance.

Distance Calculation Method Employing MUSIC Method

Next, another example of the distance calculating method will be described. In the above example, the phase change amounts of the reception signals are detected for two frequencies, and the distance r is calculated by Formula 9 on the basis of the phase change amounts. To the contrary, as described later, the distance r may be calculated by employing the thinking method of an MUSIC (MUltiple Signal Classification) method, which is one of the high-resolution spectrum analysis methods.

The MUSIC method has been widely used as a method of estimating the direction of arrival of radio waves. In the MUSIC method, the direction of arrival of radio waves is estimated by analyzing the reception signals received through a plurality of antenna elements. The distance r can be estimated using the MUSIC method by replacing the reception signals received through each of the antenna elements for estimation of the direction of arrival with the reception signals of each frequency so as to transform the application model (a mode vector $a(\theta_i)$ used in the estimation of the direction of arrival) (see Formula 11) in the MUSIC method into a mode vector $a(r_i)$ used in the estimation of the distance (see Formula 12). By employing the MUSIC method in the estimation of the distance r, as described later, it becomes possible to further reduce the effect of multiple paths under real environment involving the occurrence of multiple paths and thus to further increase the precision.

That is, assuming the number of array antenna elements is K; the wavelength of incoming waves is λ; the number of incoming waves is L; and the arrival angle of the i-th incoming waves is $\theta_i$ (I=1 to L), an array response vector $a(\theta_i)$ for the i-th incoming waves can be expressed as:

$$a(\theta_i)=[\exp\{j\Phi_1(\theta_i)\},\ldots,\exp\{j\Phi_K(\theta_i)\}]^T;$$

$$\Phi_N(\theta_i)=-(2\pi/\lambda)d_N\sin(\theta_i) \qquad \text{(see Formula 11).}$$

In the above formula, $\Phi_N(\theta_i)$ is a reception phase of the i-the incoming waves in the N-th antenna element; T is a transposition; and $d_N$ is the location of the N-th antenna element.

Figure 9A:
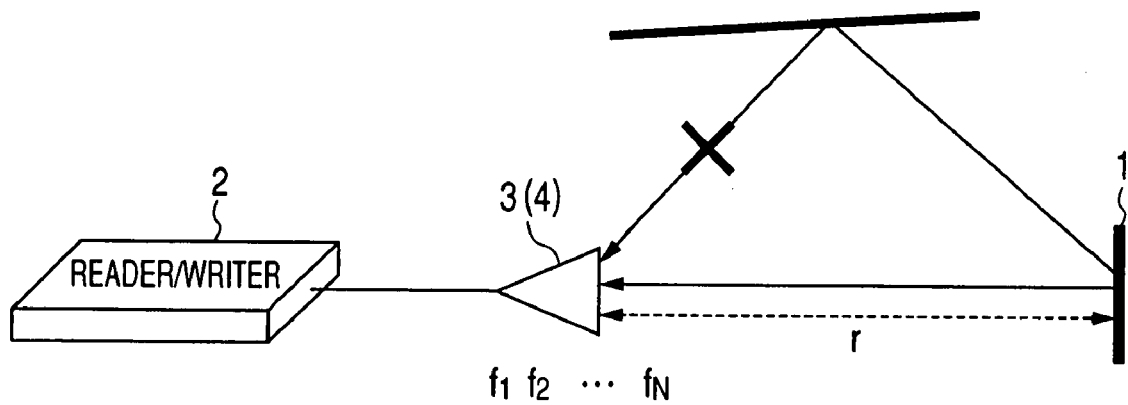
FIG. 9A is a diagram showing the state in which multiple paths occur in the communication between the reader/writer and the RFID tag.
Figure 9B:
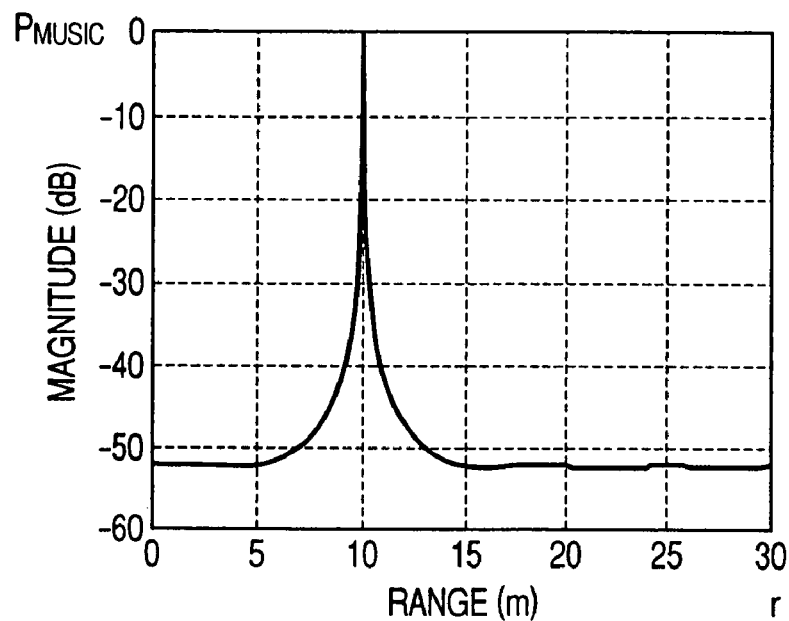
FIG. 9B is a graph showing the change of a MUSIC evaluation function relative to distance.
Figure 9C:
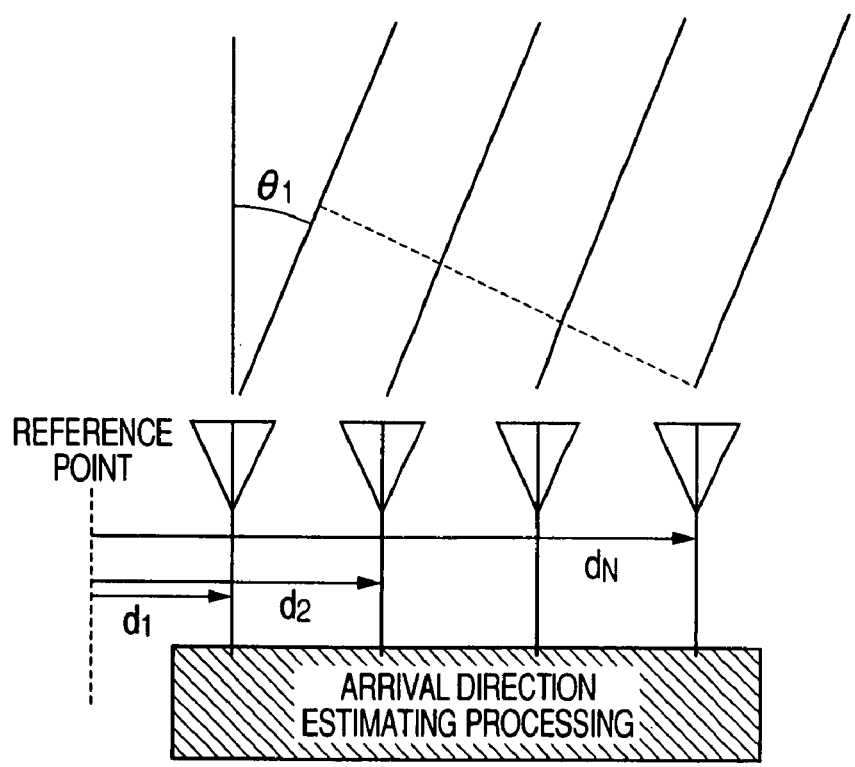
FIG. 9C is a diagram for explaining a processing of estimating the direction

In Formula 11, the mode vector $a(r_i)$ (see Formula 12) can be derived by replacing the number K of array antenna elements with the number of used frequencies ($f_1, f_2, f_3, \ldots,$ and $f_K$); the arrival angle $\theta_i$ of the i-th incoming waves with the distance $r_i(r_1$ to $r_L)$ to the i-th tag; the array response vector $a(\theta_i)$ for the i-th incoming waves with the array response vector $a(r_i)$ for the i-th tag; and the reception phase $\Phi_N(\theta_i)$ of the i-th incoming waves in the N-th antenna element with the reception phase $\Phi_N(r_i)(\Phi_N(r_i)=-2\pi f_N \cdot 2r_i/c$; c is the speed of light ($3*10^8$) of the signal received from the i-th tag via the N-th frequency (see FIG. 9C).

$$a(\theta_i) = \left[\exp\left(-j\frac{2\pi}{\lambda}d_1\sin\theta_i\right), \Lambda, \exp\left(-j\frac{2\pi}{\lambda}d_N\sin\theta_i\right)\right]^T \quad \text{[Formula 11]}$$

$$a(r_i) = \left[\exp\left(-j2\pi f_1\frac{2r_i}{c}\right), \Lambda, \exp\left(-j2\pi f_N\frac{2r_i}{c}\right)\right]^T \quad \text{[Formula 12]}$$

Hereinafter, details of the distance measurement processing employing the MUSIC method (hereinafter will be referred to as a distance estimation MUSIC method) will be described. The distance measurement processing described later is performed by the location measure 8.

In the case of the reception signals of frequency $f_1$, $I_1(t)$ that represents the state of the I signal and $Q_1(t)$ that represents the state of the Q signal are expressed by Formula 5 and Formula 6, respectively. Here, $x_1(t)$ that represents the reception signals of frequency $f_1$ as a complex representation can be expressed by the following formula.

$$x_1(t) = D(t)A[I_1(t) + jQ_1(t)] \quad \text{[Formula 13]}$$

Similarly, $x_N(t)$ that represents the reception signals of frequency $f_N$ as a complex representation can be expressed by the following formula.

$$x_N(t) = D(t)A[I_N(t) + jQ_N(t)] \quad \text{[Formula 14]}$$

Considering the case in which the reception signals are received via K frequencies, a correlation matrix $R_{XX}$ can be produced on the basis of the reception signals of frequencies $f_1$ to $f_K$ as follows.

$$R_{xx} = E[X(t)X(t)]^H$$

$$\Theta X(t) = [x_1(t), x_2(t), \Lambda, x_K(t)] \quad \text{[Formula 15]}$$

In the above formula, H is a complex conjugate transposition; and E[ ] is a temporal average. Next, eigen value decomposition is applied to the correlation matrix $R_{xx}$ obtained above by the following formula.

$$R_{xx}e_i = (\mu_i + \sigma^2)e_i \quad \text{[Formula 16]}$$

In the above formula, $e_i$ is an eigenvector of $R_{xx}$; $\mu_i$ is an eigen value; and $\sigma^2$ is a noise power. From the above facts, the following relation is satisfied.

$$e_i^H a(r) = 0 \quad \text{[Formula 17]}$$

here, $1 \leq i \leq L$ $$a(r_i) = \left[\exp\left(-j2\pi f_1\frac{2r_i}{c}\right), \Lambda, \exp\left(-j2\pi f_K\frac{2r_i}{c}\right)\right]^T \quad \text{[Formula 18]}$$

From the above facts, the mode vector and MUSIC evaluation function $P_{MUSIC}$ in the distance estimation MUSIC method is given as follows.

$$P_{MUSIC}(r) = \frac{a^H(r)a(r)}{\sum_{i=L+1}^{K}|e_i^H a(\theta)|^2} \quad \text{[Formula 19]}$$

In the above formula, by varying the distance r, the graph as shown in FIG. 9B is obtained. In the graph, the horizontal axis represents the distance r, and the vertical axis represents the evaluation function $P_{MUSIC}$. As shown in the graph, the evaluation function $P_{MUSIC}$ includes a peak value and the value of r corresponding to the peak value corresponds to the distance r to be calculated.

In the graph shown in FIG. 9B, although the evaluation function $P_{MUSIC}$ includes only one peak value, other peak values may exist. This is because with the influence of multiple paths, the peak values are produced at distances corresponding to the multiple paths. Even in such a case, because the distances corresponding to the multiple paths are longer than the distance r that should be calculated, by selecting the shortest of the distances corresponding to the peak values as the distance to be calculated, it becomes possible to calculate the distance r with high accuracy.

In the above example, although the MUSIC method as the high-resolution spectrum analysis method is employed in the distance measurement, other high-resolution spectrum analysis methods such as Beam former method, Capon method, LP (Linear Prediction) method, Min-Norm method, or ESPRIT method may be employed in the distance measurement.

Procedures of Distance Measurement Processing Employing MUSIC Method

Figure 10:
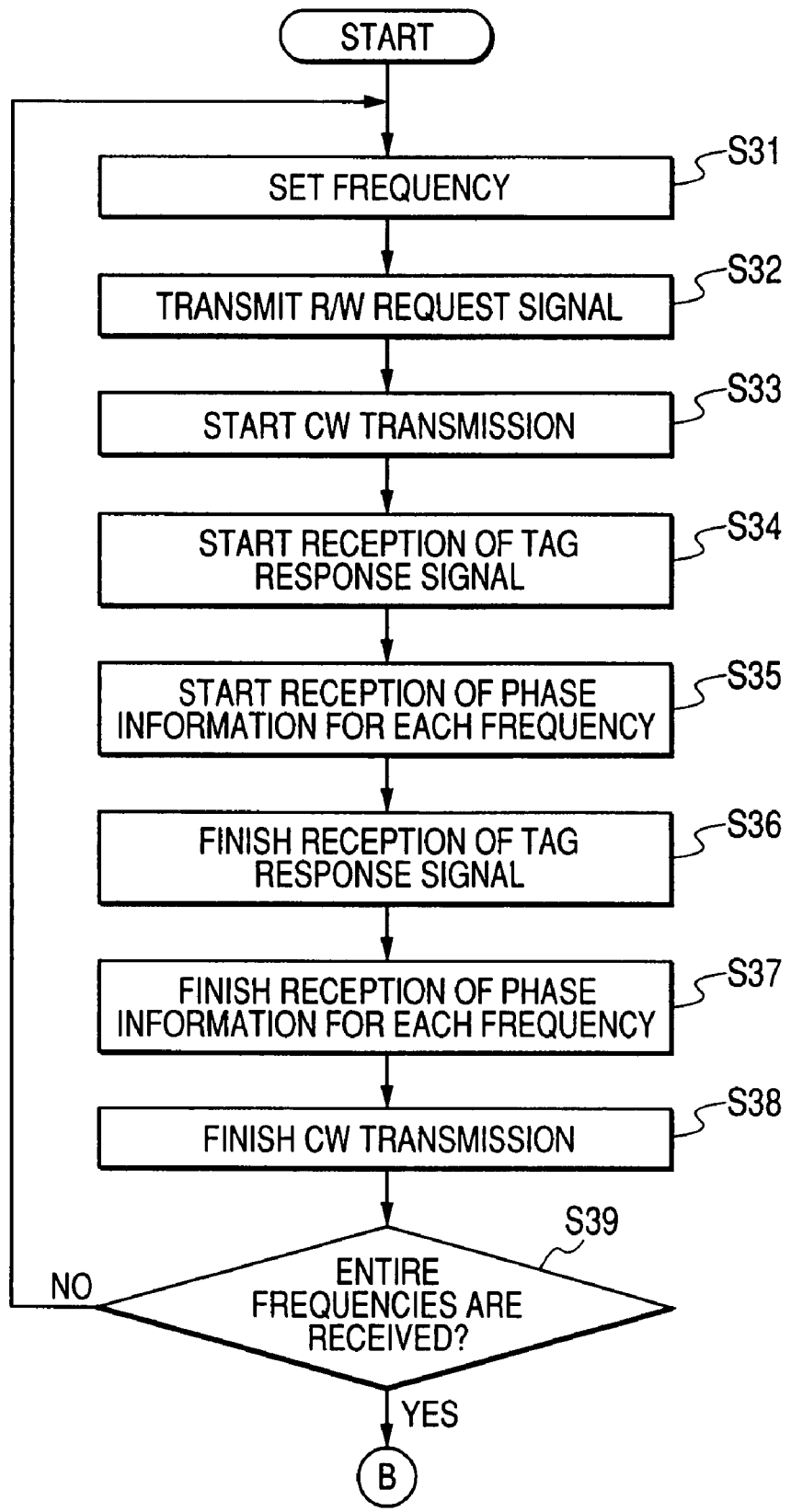
FIG. 10 is a flowchart showing the first half of the procedures of the distance measurement processing employing an MUSIC method.
Figure 11:
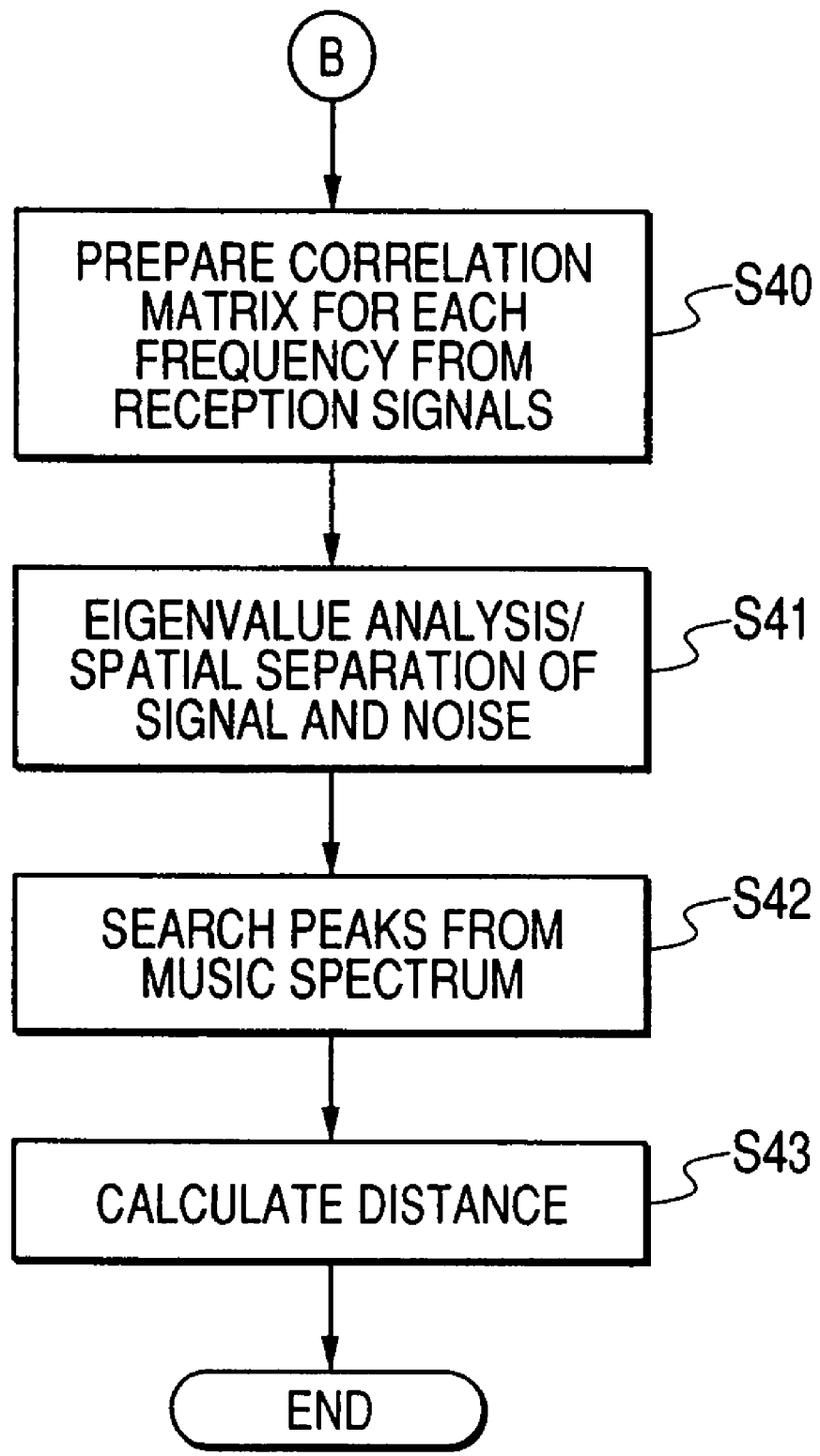
FIG. 11 is a flowchart showing the second half of the procedures of the distance measurement processing employing the MUSIC method.

Next, the procedures of the distance measurement processing employing the MUSIC method in the reader/writer 2 will be described with reference to the flowcharts of FIGS. 10 and 11.

First, when the distance measurement processing is started, in S31, the frequency controller 7A controls the PLL section 5A to adjust the frequency of the carrier signal used to transmit the R/W request signal so as to become the first frequency $f_1$.

Next, the transmission controller 7B controls the modulator 5B to superimpose the data representing the R/W request signal to the carrier signal. The transmission signal modulated by the modulator 5B is amplified by the power amplifier 5C and is then outputted from the transmitter antenna 3 (S32). Following the transmission of the R/W request signal, the CW (continuous carrier wave) is transmitted via the first frequency $f_1$ (S33).

When detecting the R/W request signal, the RFID tag 1 transmits, as a reply, the tag response signal via a carrier frequencies corresponding to the first frequency $f_1$ of the CW (continuous carrier wave) that is detected subsequent to the R/W request signal. When the tag response signal is received by the receiver antenna 4, the reception processor 6 performs a reception processing to the tag response signal (S34); and the phase information acquirer 8A performs a phase information acquiring processing (S35).

That is, in the reception processor 6, on the basis of Formulas 4 to 6, the frequency converter 6B calculates the I signal and the Q signal by multiplying the reception signals inputted from the amplifier 6A and the carrier signal outputted from the PLL section 5A. When acquiring the I signal and the Q signal from the frequency converter 6B, on the basis of Formulas 13 and 14, the phase information acquirer 8A calculates $x_1(t)$ that represents the reception signals of the first frequency $f_1$ as a complex representation and stores the complex representation $x_1(t)$ and the frequency (first frequency $f_1$) used as the carrier signal in a table in a correlated manner.

When the reception processor 6 finishes the reception of the tag response signal from the RFID tag 1 (S36), the phase information acquirer 8A finishes the phase information acquiring processing (S37). Thereafter, the transmission processor 5 finishes the transmission of the CW (continuous carrier wave), that is, the transmission of the one-frame signal (S38). The reception controller 7C determines whether the reception signals has been received for the entire frequencies.

If it is determined that the reception signals has not been received for the entire frequencies, the procedure goes back to the processing of S31. In this case, assuming the first to N-th frequencies are used as a frequency of the reception signals, the reception controller 7C determines whether the reception signals has been received for the entire, first to N-th frequencies.

At this moment, since the reception signals is received only for the first frequency $f_1$, the procedure goes back to the processing of S31. When the processing of S31 is performed again, the frequency controller 7A controls the PLL section 5A to adjust the frequency of the carrier signal (and the CW (continuous carrier wave)) used to transmit the R/W request signal so as to become the first frequency $f_2$. Thereafter, processes of S32 to S38 are repeated until the reception of the reception signals is confirmed for the N-th frequency. If it is determined in S39 that the reception signals has been received for the entire frequencies, the procedure goes to the processing of S40.

In S40, the location measure 8 reads the reception signals $x_n(t)$ of each frequency from the table and creates the correlation matrix $R^{xx}$ on the basis of the reception signals of each frequency. Next, the location measure 8 applies the eigen value decomposition to the correlation matrix $R_{xx}$ (S40) and obtains spectra of the MUSIC evaluation function $P_{MUSIC}$ so as to search peak values (S42). In this manner, the distance r is calculated in S43.

Frequency Switching within One Frame

In the above example, the reader/writer 2 is configured to transmit the R/W request signal a plurality of times while changing the carrier frequencies in each transmission and to receive the tag response signal of which the frequencies of the carrier signal are different from each other. To the contrary, the reader/writer 2 may be configured to calculate the distance such that the carrier frequencies is changed more than one times in the course of transmitting the R/W request signal and CW (continuous carrier wave) that is composed of one frame, and the tag response signal that is composed of one frame is received with the carrier frequencies changed more than one times in the midway, thereby calculating the distance on the basis of the tag response signal.

The reader/writer 2 is always transmitting a specific signal. When requesting the RFID tag 1 to transmit the tag response signal, as shown in FIG. 12A, the reader/writer 2 transmits the R/W request signal that requests a reply of the tag response signal. The frequency controller 7A sets a plurality of divided periods in the transmission period of the R/W request signal (more specifically, in the transmission period of the CW (continuous carrier wave) following the R/W request signal) and controls the PLL section 5A such that different carrier frequencies are used for each of the divided periods. In the example shown in FIG. 12A, three divided periods are set such that frequency $f_1$ is used in the first divided period, frequency $f_2$ is used in the second divided period, and frequency $f_3$ is used in the third divided period.

The RFID tag 1 is always monitoring the signals sent from the reader/writer 2. When detecting reception of the R/W request signal, the RFID tag 1 transmits the tag response signal in the form of responding to the R/W request signal. In this case, the carrier frequencies of the tag response signal are changed with the temporal change of the carrier frequencies of the R/W request signal (more specifically, the CW (continuous carrier wave) following the R/W request signal). In the example shown in FIG. 12B, the carrier frequencies of the tag response signal are configured such that frequency $f_1$ is used in the first period, frequency $f_2$ is used in the second period, and frequency $f_3$ is used in the first period.

By receiving such tag response signal, the location measure 8 becomes possible to detect the states of the reception signals transmitted via a plurality of different frequencies. In the reception processor 6, the timings for changing the frequencies of the tag response signal are set on the basis of the frequency switching over timings at the time of transmitting the R/W request signal (more specifically, the CW (continuous carrier wave) following the R/W request signal).

Here, the period in which the carrier frequencies of the tag response signal are switched is preferably set within the period of the preamble section. This is because the length of the data section varies in the tag response signal, but the length of the preamble section is fixed. Thus, it becomes possible to secure the period in which the carrier frequencies are switched.

Procedures of Distance Measurement Processing Involving Frequency Switching within One Frame Next, the procedures of the distance measurement processing that involves frequency switching over within one frame in the reader/writer 2 will be described with reference to the flowchart of FIG. 13.

First, when the distance measurement processing is started, the frequency controller 7A controls the PLL section 5A such that the frequencies of the carrier signal (more specifically, the CW (continuous carrier wave) following the R/W request signal) to be used at the time of transmitting the R/W request signal are switched over for each of the plurality of divided periods. Next, the transmission controller 7B controls the modulator 5B to superimpose the data representing the R/W request signal to the carrier signal. The transmission signal modulated by the modulator 5B is amplified by the power amplifier 5C and is then outputted from the transmitter antenna 3 (S51). Following the transmission of the R/W request signal, the CW (continuous carrier wave) is transmitted via different frequencies for each of the plurality of divided periods (S53, S55, S58). Accordingly, the R/W request signal (more specifically, the CW (continuous carrier wave) following the R/W request signal) is transmitted in which frequencies are switched over in each of the divided periods.

When detecting the R/W request signal, the RFID tag 1 transmits, as a reply, the tag response signal via a carrier frequencies (frequencies $f_1$, $f_2$, and $f_3$) corresponding to the time-varying carrier frequencies (frequencies $f_1$, $f_2$, and $f_3$) of the CW (continuous carrier wave) that is detected subsequent to the R/W request signal. When the tag response signal is received by the receiver antenna 4, the reception processor 6 performs a reception processing to the tag response signal (S53, S56, S59); and the phase information acquirer 8A performs a phase information acquiring processing (S54, S57, S60). In this case, the carrier frequencies of the tag response signal received are changed with the temporal change of the carrier frequencies of the R/W request signal (more specifically, the CW (continuous carrier wave) following the R/W request signal).

That is, in the reception processor 6, the frequency converter 6B identifies the preamble section from the tag response signal, and calculates the I signal and the Q signal for each frequency of the divided periods in the preamble section on the basis of Formulas 4 to 6. When acquiring the I signal and the Q signal for each frequency from the frequency converter 6B, on the basis of Formula 7 and 8, the phase information acquirer 8A calculates the phase change amounts $\phi_1$ and $\phi_2$ for each frequency and stores the amounts and the frequency used as the carrier signal in a table in a correlated manner. In this case, the switching over timings of the divided periods are set on the basis of the frequency switching over timings at the time of transmitting the R/W request signal (more specifically, the CW (continuous carrier wave) following the R/W request signal).

In the reception processor 6 and the phase information acquirer 8A, the frequency switching processing and the phase information acquiring processing for each frequency (frequencies $f_1$, $f_2$, $f_3$) of the divided periods in the preamble section of the tag response signal are performed when the transmission processor 5 is transmitting the CW (continuous carrier wave) of a corresponding frequency. For example, when the transmission processor 5 starts transmission of the CW (continuous carrier wave) at the first frequency $f_1$ (S52), the RFID tag 1 transmits, as a reply, the signal corresponding to the first divided period in the preamble section of the tag response signal via the first frequency $f_1$. The reception processor 6 receives the tag response signal of the frequency $f_1$ (S53), and the phase information acquirer 8A acquires the phase information of the frequency $f_1$ (S54). After a prescribed period, the transmission processor 5 starts transmission of the CW (continuous carrier wave) at the second frequency $f_2$ (S55). When receiving the CW (continuous carrier wave) of the second frequency $f_2$, the RFID tag 1 transmits, as a reply, the signal corresponding to the subsequent divided period in the preamble section of the tag response signal via the second frequency $f_2$. The reception processor 6 receives the tag response signal of the frequency $f_2$ (S56), and the phase information acquirer 8A acquires the phase information of the frequency $f_2$ (S57). After a prescribed period, the transmission processor 5, the reception processor 6, and the phase information acquirer 8A performs the same operations with respect to the third frequency $f_3$ (S58 to S60).

When the reception processor 6 finishes the reception of the tag response signal from the RFID tag 1 (S61), the transmission processor 5 finishes the transmission of the CW (continuous carrier wave), that is, the transmission of the one-frame signal (S62). Thereafter, the distance calculator 8B calculates the distance r on the basis of the phase information of the plurality of different frequencies stored in the table, thereby completing the processing (S63).

In the above example, the distance r is calculated on the basis of phase. However, the same can be applied to the distance measurement processing employing the MUSIC method. In addition, there may be configured such that two reception signals of which the S/N ratio and the signal level of the I and Q signals are higher than those of other reception signals are selected, and the detection of the phase change amount and the location calculation are performed on the basis of the two reception signals selected.

Identification of Distance to RFID Tags

As described above, the data section is included in the tag response signal. When the data section contains ID information that is unique to each RFID tag 1, it becomes possible to identify the distance measured using the tag response signal in the above-described manner and the RFID tag 1 that transmitted the tag response signal in a linked manner. Hereinafter, the configuration for enabling such identification will be described with reference to FIG. 14.

Figure 4:
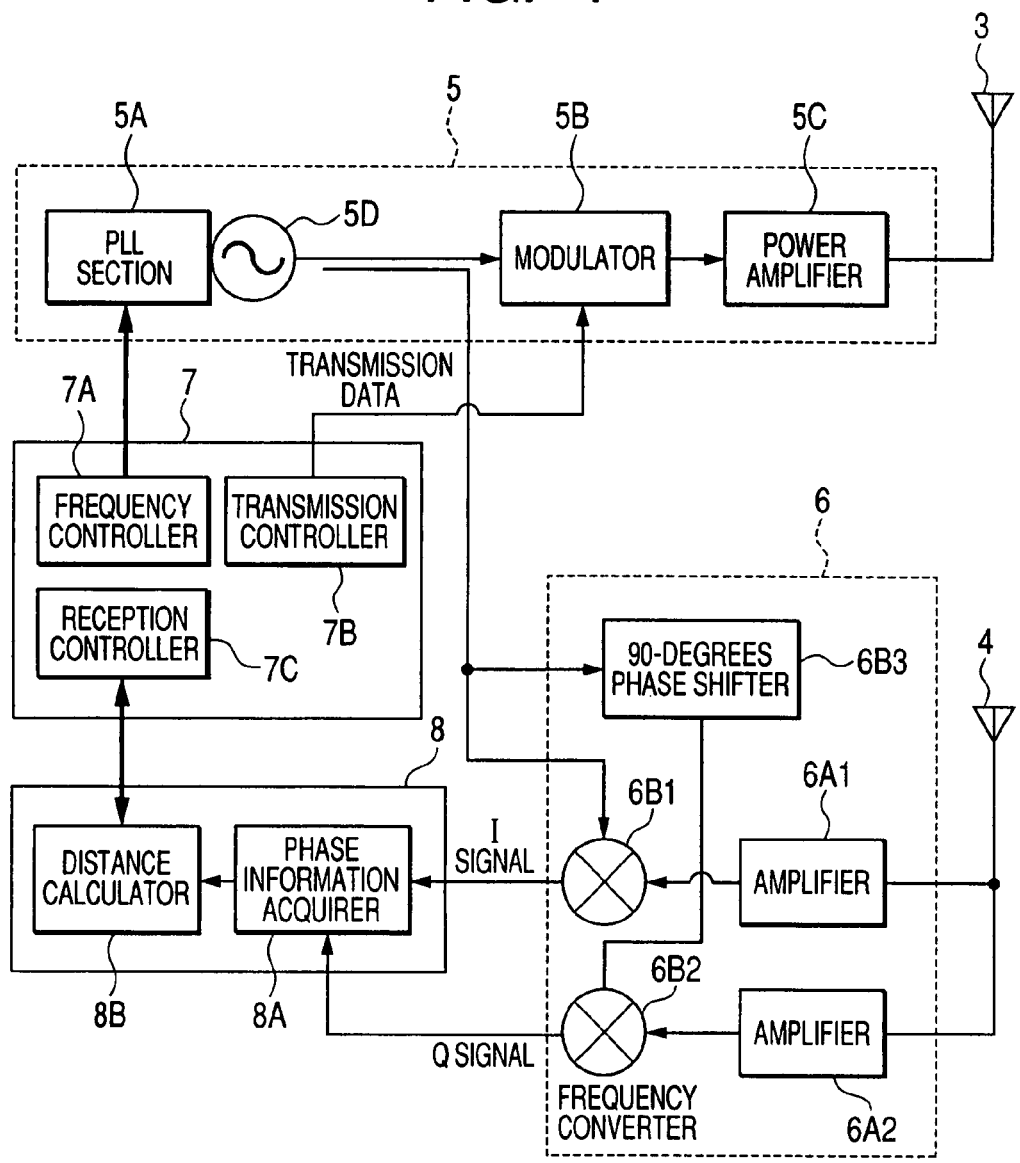
FIG. 4 is a simplified block diagram of the reader/writer, showing the detailed configuration of a reception processor that enables to perform phase detection.
Figure 14:
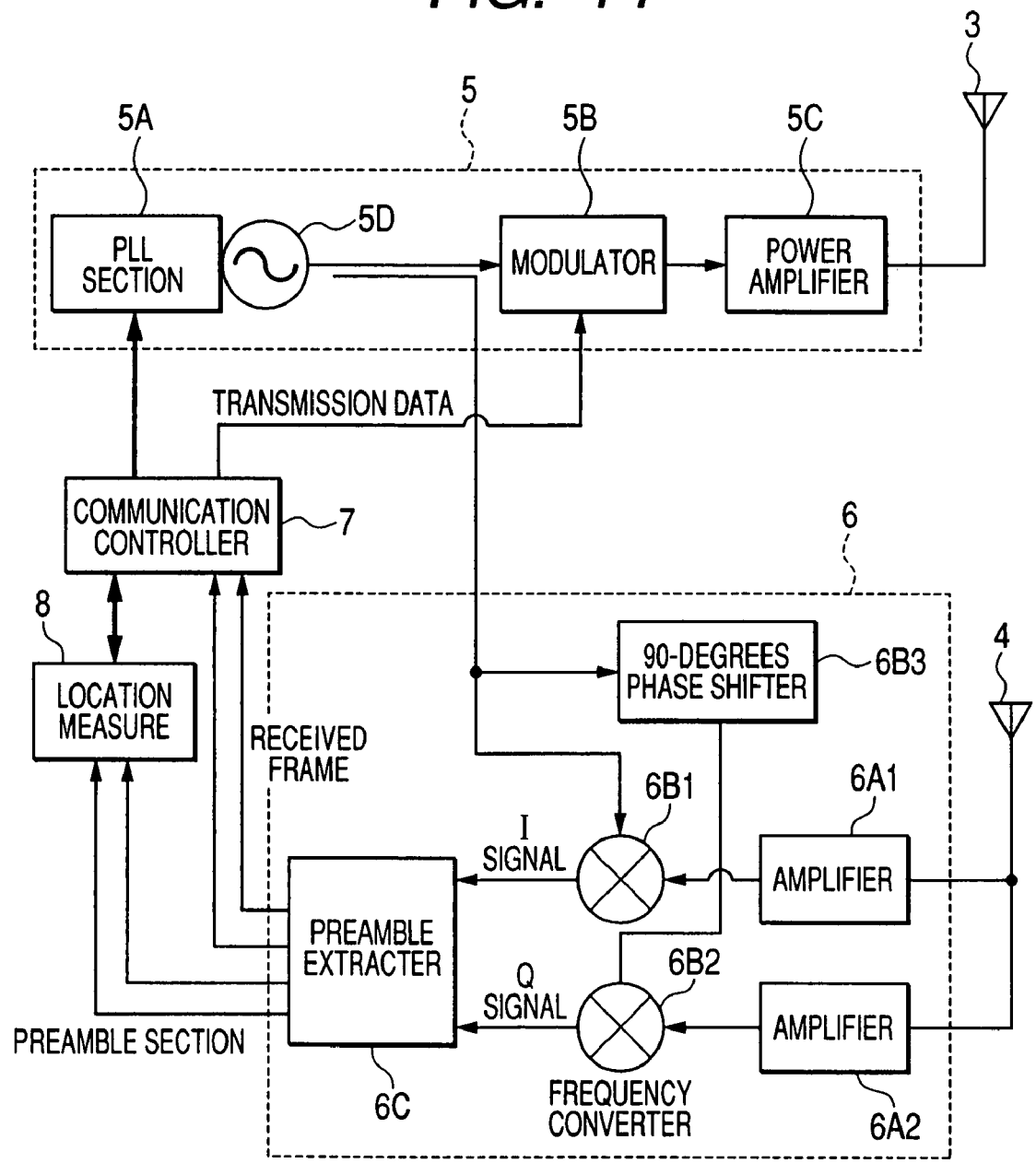
FIG. 14 is a simplified block diagram showing the configuration of the reader/writer that enables to identify the RFID tags and the distances thereof in a linked manner.

The configuration shown in FIG. 14 is different from that of FIG. 4 in that the reception processor 6 of FIG. 14 is provided with a preamble extractor 6C. Other configurations are the same as those of FIG. 4, and thus descriptions thereof will be omitted.

The preamble extractor 6C receives the I signal and the Q signal that are outputted from the mixer 6B1 and the mixer 6B2, respectively to extract the preamble section of the tag response signal, and transfers the preamble section to the location measure 8. At this time, the data section of the tag response signal is transferred as a reception frame to the reception controller 7C of the communication controller 7. The location measure 8 analyzes the preamble section to measure the distance in the above-described manner and transfers the measurement information to the reception controller 7C.

The reception controller 7C identifies the ID information of the RFID tag 1 that transmitted the tag response signal by analyzing the data section received from the preamble extractor 6C. The reception controller 7C identifies the measurement result of the distance to the RFID tag 1 measured by the location measure 8 and the ID information in a linked manner. Accordingly, even when the RFID tag communication system communicates with a plurality of RFID tags 1, it becomes possible to distinguish the distance to each of the RFID tags 1.

The information that is identified along with the distance information in the linked manner is not limited to the ID information that is unique to each of the RFID tags 1. Other information may be linked to the distance information as long as the information is described in the data section of the tag response signal.

Procedures of Distance Measurement Processing with Identification of RFID Tags

Figure 15:
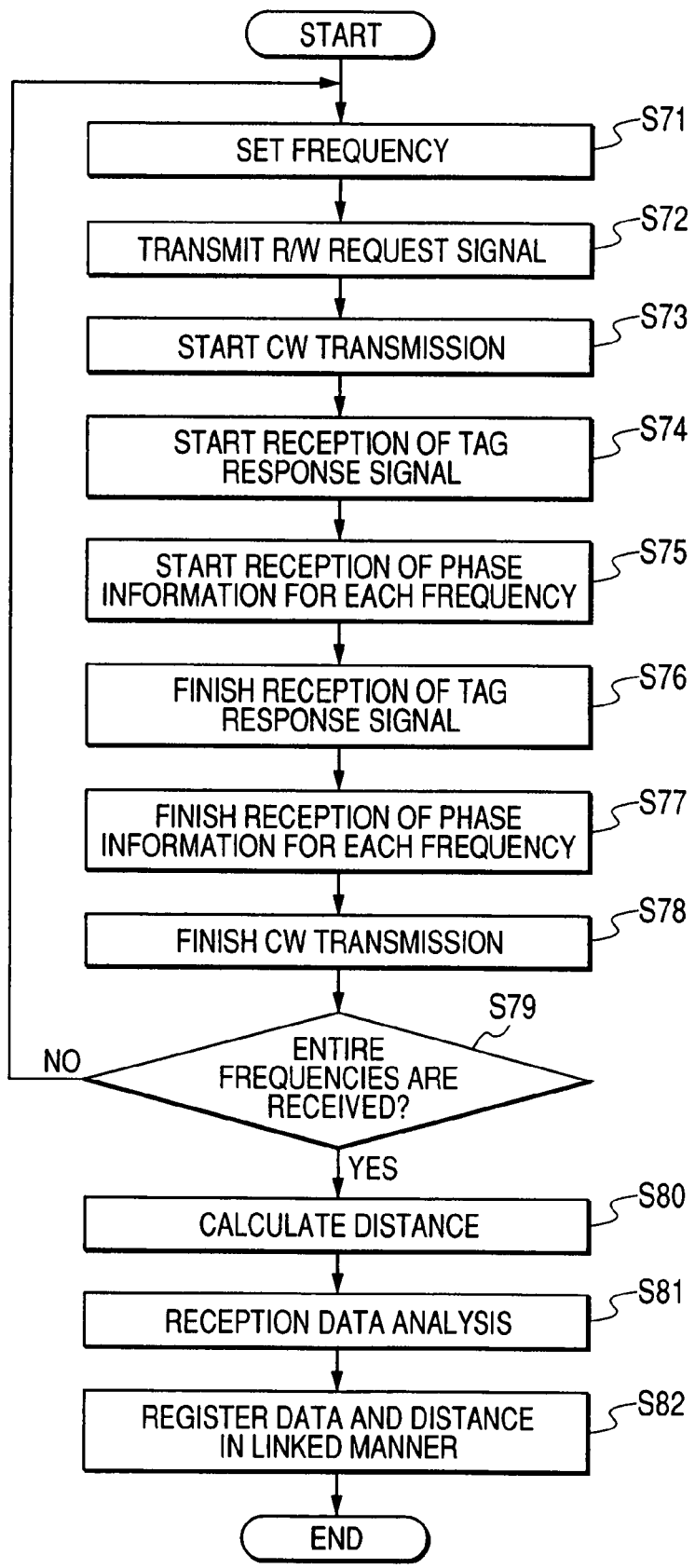
FIG. 15 is a flowchart showing the procedures of the distance measurement processing based on identification of the RFID tags.

Next, the procedures of the distance measurement processing with identification of the RFID tags in the reader/writer 2 will be described with reference to the flowchart of FIG. 15.

First, when the distance measurement processing is started, in S71, the frequency controller 7A controls the PLL section 5A to adjust the frequency of the carrier signal used to transmit the R/W request signal so as to become the first frequency $f_1$.

Next, the transmission controller 7B controls the modulator 5B to superimpose the data representing the R/W request signal to the carrier signal. The transmission signal modulated by the modulator 5B is amplified by the power amplifier 5C and is then outputted from the transmitter antenna 3 (S72). Following the transmission of the R/W request signal, the CW (continuous carrier wave) is transmitted via the first frequency $f_1$ (S73).

When detecting the R/W request signal, the RFID tag 1 transmits, as a reply, the tag response signal via a carrier frequencies corresponding to the first frequency $f_1$ of the CW (continuous carrier wave) that is detected subsequent to the R/W request signal. When the tag response signal is received by the receiver antenna 4, the reception processor 6 performs a reception processing to the tag response signal (S74); and the phase information acquirer 8A performs a phase information acquiring processing (S75).

That is, in the reception processor 6, on the basis of Formulas 4 to 6, the frequency converter 6B calculates the I signal and the Q signal by multiplying the reception signals inputted from the amplifier 6A and the carrier signal outputted from the PLL section 5A. The preamble extractor 6C extracts the preamble section of the received tag response signal (I signal and Q signal) and transfers the preamble section to the location measure 8. At this time, the data section of the tag response signal is transferred to the reception controller 7C. When receiving the preamble section from the preamble extractor 6C, on the basis of Formula 7 and 8, the location measure 8 calculates the phase change amounts $\phi_1$ and $\phi_2$ attributable to the first frequency $f_1$ and stores the amounts and the frequency (first frequency $f_1$) used as the carrier signal in a table in a correlated manner (S75).

When the reception processor 6 finishes the reception of the tag response signal from the RFID tag 1 (S76), the location measure 8 finishes the phase information acquiring processing (S77). Thereafter, the transmission processor 5 finishes the transmission of the CW (continuous carrier wave) (S78). The reception controller 7C determines whether the reception signals has been received for the entire frequencies. If it is determined that the reception signals has not been received for the entire frequencies (NO in S79), the procedure goes back to the processing of S71. If it is determined that the reception signals has been received for the entire frequencies (YES in S79), the procedure goes to the processing of S80.

In S80, the location measure 8 extracts the phase information of each frequency from the table to calculate the distance (S80). The location measure 8 may calculate the distance by using the above-described MUSIC method as well as on the basis of the phase information.

Meanwhile, when receiving the data section from the preamble extractor 6C, the reception controller 7C verifies the ID information of the RFID tag 1 that transmitted the tag response signal on the basis of the data section (S81). Then, the reception controller 7C registers the distance information received from the location measure 8 and the ID information of the RFID tag 1 in a linked manner (S82). The combined information of the distance and the ID information of the RFID tag 1 is registered in a recording section (not shown) provide in the communication controller 7 and is then transmitted to an external apparatus through the external communicator 9 shown in FIG. 2. In this manner, the distance measurement processing is completed.

Location Estimating Processing

In the above example, measurement of the distance to each of the RFID tags 1 has been described. The direction of location where each RFID tag 1 exists as seen from the reader/writer 2 may be measured. With such measurement, it becomes possible to specify the distance to and the direction of each RFID tag 1 and thus to specify the location where each RFID tag 1 exist. As a method of estimating the direction of location where the RFID tag 1 exists, a method can be used in which the plurality of antenna elements of the receiver antenna 4 are arranged in an array configuration, and the difference between phases of the signals received at each of the antenna elements is detected. Hereinafter, a processing of estimating the direction of location where the RFID tag 1 exists will be described.

Figure 16:
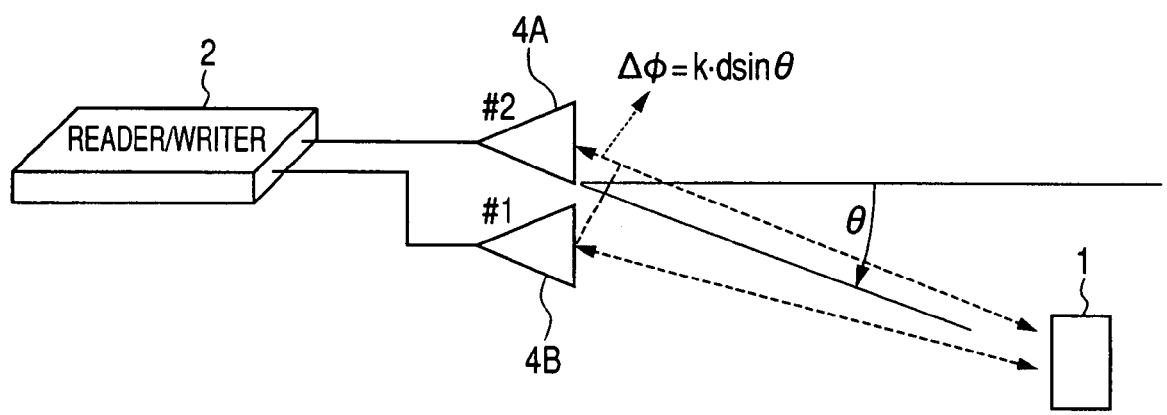
FIG. 16 is a schematic diagram showing the processing of estimating the direction of location where the RFID tag exists.

FIG. 16 is a schematic diagram showing the processing of estimating the direction of location where the RFID tag exists. In the drawing, the receiver antenna 4 is constituted by two antenna elements: a first antenna element 4A; and a second antenna element 4B. In addition, θ designates an angle indicating the direction of location where the RFID tag 1 exists. This angle θ is measured in a state in which a normal line direction of a plane including both of radio wave reception points at the first antenna element 4A and the second antenna element 4B is set to 0 degree.

Assuming the distance between the radio wave reception points at the first antenna element 4A and the second antenna element 4B is d, a phase difference Δφ of signals received at the first antenna element 4A and the second antenna element 4B is represented by the following formula.

$$\Delta\phi = k \cdot d \sin\theta \qquad \text{[Formula 20]}$$

$$\Theta k = \frac{2\pi}{\lambda}$$

Here, assuming d=λ/2, the phase difference Δφ is represented by the following formula.

$$\Delta\phi = \pi \sin\theta \qquad \text{[Formula 21]}$$

Thus, on the basis of a phase difference Δφ, the direction of existent location θ is represented by the following formula.

$$\theta = \sin^{-1}\frac{\Delta\phi}{\pi} \qquad \text{[Formula 22]}$$

That is, it is possible to obtain the direction of existent location θ by obtaining the phase difference Δφ.

Figure 17:
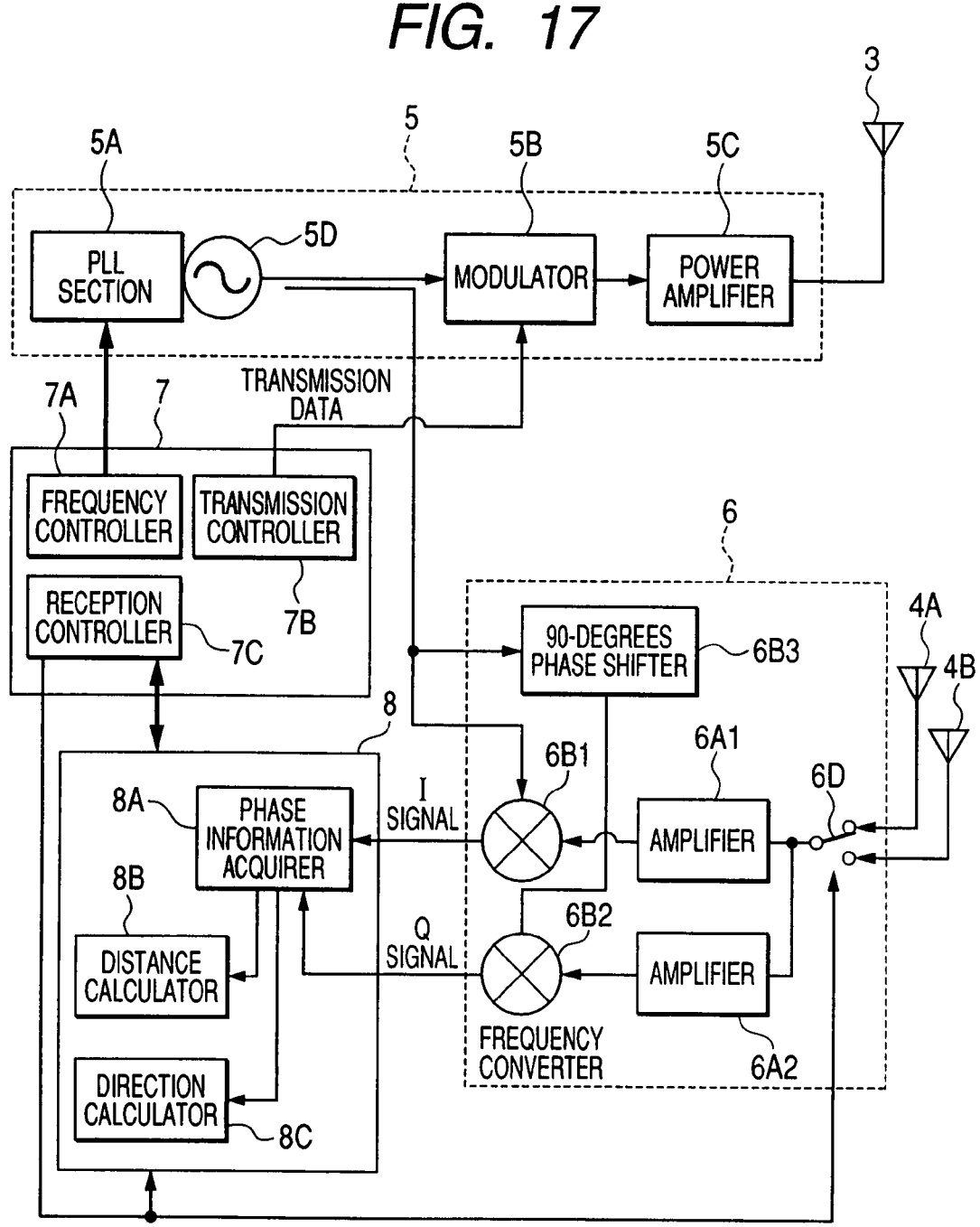
FIG. 17 is a simplified block diagram of the reader/writer, showing the configuration for calculating the direction.

FIG. 17 shows the configuration of the reader/writer 2 related to the calculation of direction. The configuration shown in the drawing is different from that shown in FIG. 4 in that in FIG. 17, a direction calculator 8C is provided to the location measure 8, and a selector 6D is provided to the reception processor 5. Other configurations are the same as the configurations shown in FIG. 4, and thus descriptions thereof will be omitted.

The selector 6D selectively switches over the signals received by the first antenna element 4A and the second antenna element 4B in the receiver antenna 4, and transfers the signals to the amplifier 6A1 and the amplifier 6A2. The selecting operation of the selector 6D is controlled by the reception controller 7C.

The direction calculator 8C acquires information about the phase difference between the signal received by the first antenna element 4A and the signal received by the second antenna element 4B from the phase information acquirer 8A, and calculates the direction of existent location θ of the RFID tag 1 on the basis of the phase difference information by the above-mentioned processing. Then, the reception controller 7C acquires the distance information calculated by the distance calculator 8B and information about the direction of existent location calculated by the direction calculator 8C, and transfers this information to the area determinant 10.

The area determinant 10 determines whether the RFID tag 1 is located within a prescribed spatial area (communication area) on the basis of the distance information and the information about the direction of existent location as the location information. At this time, the area determinant 10 determines whether the RFID tag 1 exists within the communication area on the basis of the area information that is stored in the area information storage 11.

As a method of obtaining the direction of existent location θ of the RFID tag 1, it is not limited to the above-mentioned method, and it is possible to use various known methods. For example, as technology of estimating the direction of arrival (DOA: Direction of Arrival) of radio waves, Beam former method, Capon method, LP (Linear Prediction) method, Min-Norm method, MUSIC method, and ESPRIT method can be exemplified.

Procedures of Location Estimating Processing

Figure 18:
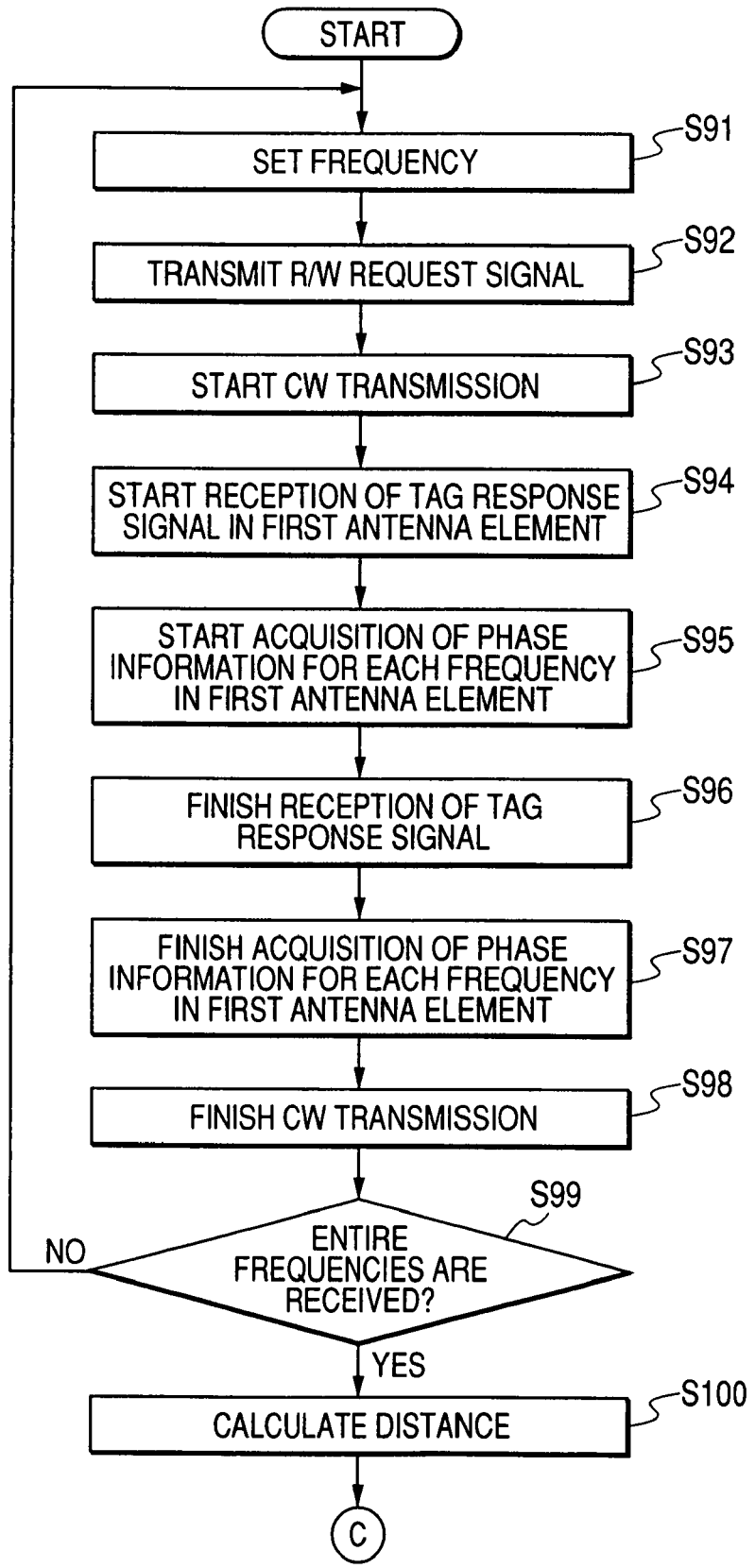
FIG. 18 is a flowchart showing the first half of the procedures of a location estimating processing.
Figure 19:
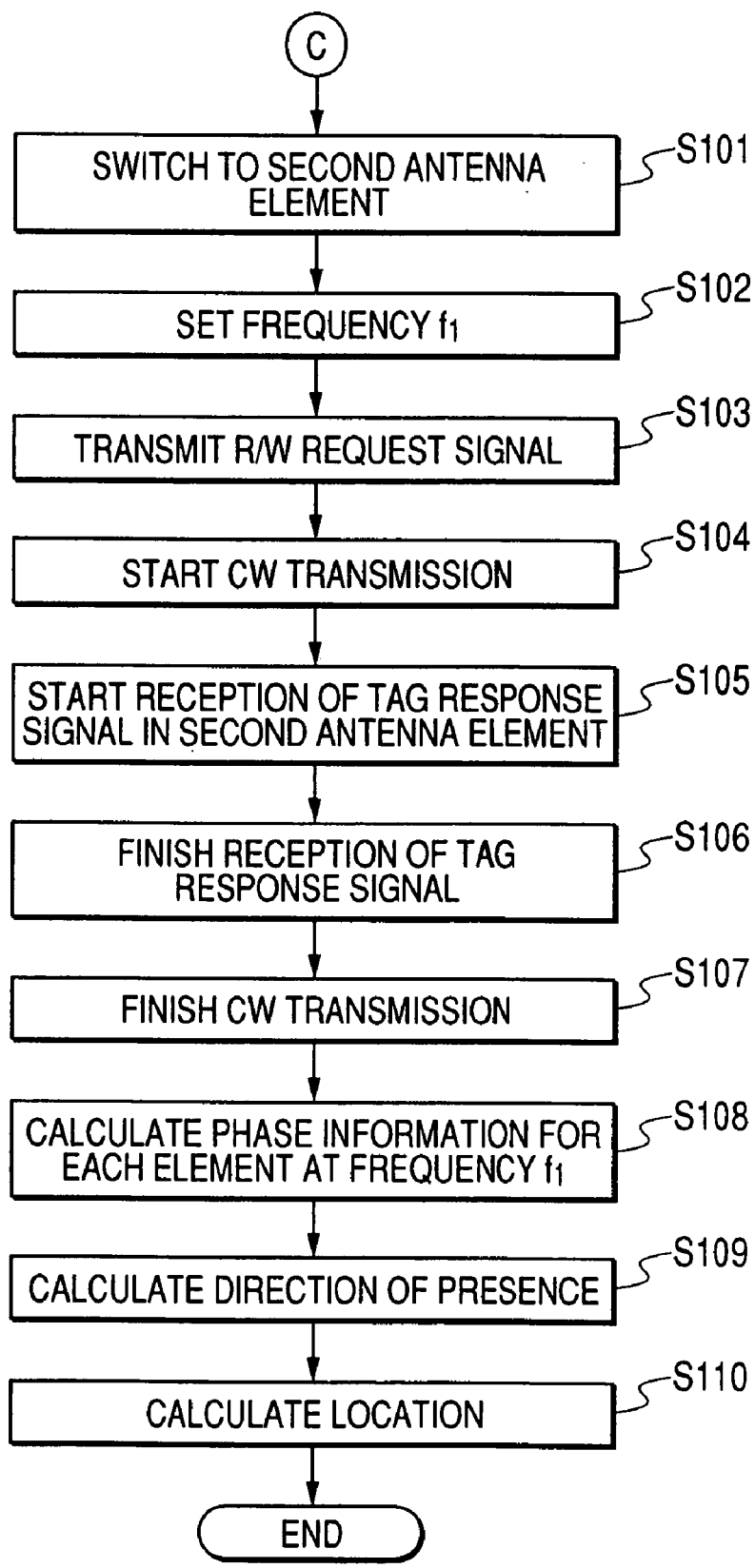
FIG. 19 is a flowchart showing the second half of the procedures of the location estimating processing.

Next, the procedures of the location estimating processing in the reader/writer 2 will be described with reference to the flowcharts of FIGS. 18 and 19.

First, when the location estimating processing is started, in S91, the frequency controller 7A controls the PLL section 5A to adjust the frequency of the carrier signal used to transmit the R/W request signal so as to become the first frequency $f_1$.

Next, the transmission controller 7B controls the modulator 5B to superimpose the data representing the R/W request signal to the carrier signal. The transmission signal modulated by the modulator 5B is amplified by the power amplifier 5C and is then outputted from the transmitter antenna 3 (S92). Following the transmission of the R/W request signal, the CW (continuous carrier wave) is transmitted via the first frequency $f_1$ (S93).

When detecting the R/W request signal, the RFID tag 1 transmits, as a reply, the tag response signal via a carrier frequencies corresponding to the first frequency $f_1$ of the CW (continuous carrier wave) that is detected subsequent to the R/W request signal. The tag response signal is received by the receiver antenna 4. At this moment, the first antenna element 4A is selected by the selector 6D. Therefore, on the basis of the signal received by the first antenna element 4A, the reception processor 6 performs a reception processing (S94); and the phase information acquirer 8A performs a phase information acquiring processing (S95).

That is, in the reception processor 6, on the basis of Formulas 4 to 6, the frequency converter 6B calculates the I signal and the Q signal by multiplying the reception signals inputted from the amplifier 6A and the carrier signal outputted from the PLL section 5A. When acquiring the I signal and the Q signal from the frequency converter 6B, on the basis of Formulas 7 and 8, the phase information acquirer 8A calculates the phase change amounts $\phi_1$ and $\phi_2$ attributable to the first frequency $f_1$ and stores the amounts and the frequency (first frequency $f_1$) used as the carrier signal in a table in a correlated manner (S95).

When the reception processor 6 finishes the reception of the tag response signal from the RFID tag 1 (S96), the phase information acquirer 8A finishes the phase information acquiring processing (S97). Thereafter, the transmission processor 5 finishes the transmission of the CW (continuous carrier wave), that is, the transmission of the one-frame signal (S98). The reception controller 7C determines whether the reception signals has been received for the entire frequencies. If it is determined that the reception signals has not been received for the entire frequencies (NO in S99), the procedure goes back to the processing of S91. If it is determined that the reception signals has been received for the entire frequencies (YES in S99), the distance calculator 8B performs a distance calculation processing (S100) and the procedure goes to the processing of S101. In this case, the location calculator 8 may calculate the distance by using the above-described MUSIC method as well as on the basis of the phase information. In addition, the distance calculation may be performed before and/or after S111 and S112.

In S101, the selector 6D is switched over to select the second antenna element 4B. Under the control of the transmission controller 7B, the R/W request signal and the CW (continuous carrier wave) are transmitted via the first frequency $f_1$ (S102 to S104). When detecting the R/W request signal, the RFID tag 1 transmits, as a reply, the tag response signal via a carrier frequencies corresponding to the first frequency $f_1$ of the CW (continuous carrier wave) that is detected subsequent to the R/W request signal. The tag response signal is received by the receiver antenna 4. At this moment, the second antenna element 4B is selected by the selector 6D. Therefore, on the basis of the signal received by the second antenna element 4B, the reception processor 6 performs a reception processing (S105).

That is, in the reception processor 6, on the basis of Formulas 4 to 6, the frequency converter 6B calculates the I signal and the Q signal by multiplying the reception signals inputted from the amplifier 6A and the carrier signal outputted from the PLL section 5A and outputs the I signal and the Q signal to the phase information acquirer 8A. When the reception processor 6 finishes the reception of the tag response signal from the RFID tag 1 (S106), the transmission processor 5 finishes the transmission of the CW (continuous carrier wave), that is, the transmission of the one-frame signal (S107).

Next, processings of S108 and S109 related to the direction calculation processing are performed.

In S108, the phase information acquirer 8A detects the phase difference between the signal received by the first antenna element 4A and the signal received by the second antenna element 4B. Then, the direction calculator 8C calculates the direction of existent location (direction of existence) of the RFID tag 1 on the basis of the phase difference (S109). In the case of estimating the direction on the basis of the phase difference between antenna elements, it is required to compare the phase differences at the same frequency.

Thereafter, the reception controller 7C acquires the distance information calculated by the distance calculator 8B and information about the direction of existent location calculated by the direction calculator 8C and transfers the information to the area determinant 10. The area determinant 10 calculates the location of the RFID tag 1 on the basis of the distance information and the information about the direction of existent location (S110). In this manner, the location measurement processing is completed.

Simultaneous Transmission of Multiple Frequencies within One Frame

In the above example, the reader/writer 2 is configured to calculate the distance such that the carrier frequencies is changed more than one times in the course of transmitting the R/W request signal and CW (continuous carrier wave) that is composed of one frame, and the tag response signal that is composed of one frame is received with the carrier frequencies changed more than one times in the midway, thereby calculating the distance on the basis of the tag response signal. To the contrary, the reader/writer 2 may be configured to calculate the distance such that the carrier frequencies used in transmitting the R/W request signal and CW (continuous carrier wave) that is composed of one frame is constituted by a plurality of frequency components, and the tag response signal that is composed of one frame is received with the carrier frequencies having a plurality of frequency components, thereby calculating the distance on the basis of the tag response signal.

Figure 20A:
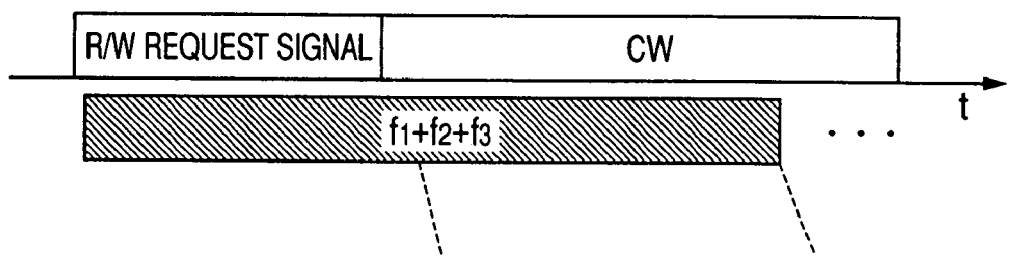
FIG. 20A is a diagram showing the case where a plurality of frequencies are simultaneously transmitted within one frame, in which signals transmitted from the reader/writer to the RFID tag and carrier frequencies thereof are illustrated on time axis.
Figure 20B:
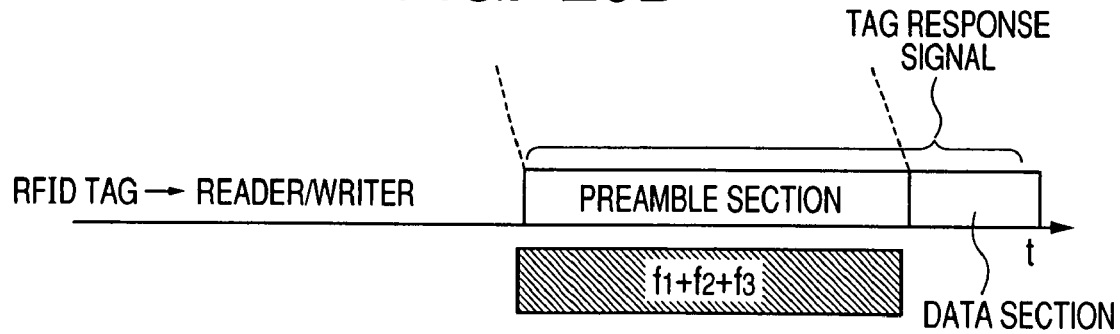
FIG. 20B is a diagram showing the case where a plurality of frequencies are simultaneously transmitted within one frame, in which signals transmitted from the RFID tag to the reader/writer and carrier frequencies thereof are illustrated on time axis.

The reader/writer 2 is always transmitting a specific signal. When requesting the RFID tag 1 to transmit the tag response signal, as shown in FIG. 20A, the reader/writer 2 transmits the R/W request signal that requests a reply of the tag response signal. The frequency controller 7A controls the PLL section 5A such that the carrier frequencies of the R/W request signal (more specifically, in the transmission period of the CW (continuous carrier wave) following the R/W request signal) is constituted by a plurality of frequency components. In the example shown in FIG. 20A, it is controlled such that the carrier frequencies is constituted by a first frequency $f_1$, a second frequency $f_2$, and a third frequency $f_3$.

The RFID tag 1 is always monitoring the signals sent from the reader/writer 2. When detecting reception of the R/W request signal, the RFID tag 1 transmits the tag response signal in the form of responding to the R/W request signal. In this case, the tag response signal is transmitted via a carrier frequencies corresponding to the carrier frequencies having a plurality of frequency components of the R/W request signal (more specifically, the CW (continuous carrier wave) following the R/W request signal). In the example shown in FIG. 20B, the carrier frequencies of the tag response signal are configured such that frequency $f_1$ is used in the first period, frequency $f_2$ is used in the second period, and frequency $f_3$ is used in the first period.

By receiving such tag response signal, the location measure 8 becomes possible to detect the states of the reception signals transmitted via a plurality of different frequencies.

Hereinafter, the configuration for enabling such detection will be described with reference to FIG. 21.

Figure 21:
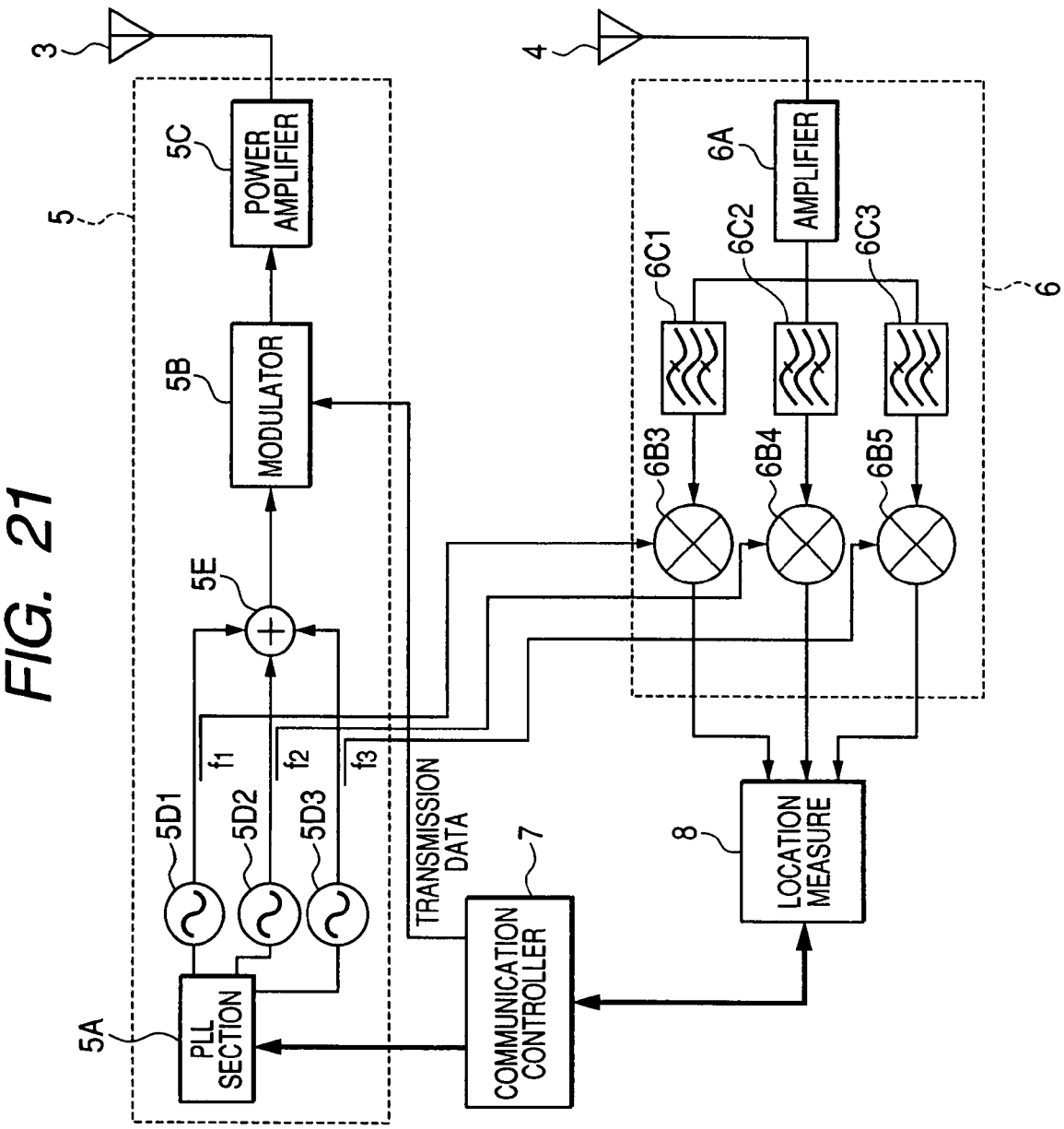
FIG. 21 is a simplified block diagram showing the configuration of the reader/writer when a plurality of frequencies are simultaneously transmitted within one frame.

The configuration shown in FIG. 21 is different from that of FIG. 4 in that the transmission processor 5 of FIG. 21 is provided with transmitters 5D1, 5D2, and 5D3 corresponding to each frequency and a combiner 5E, and the reception processor 6 is provided with band-pass filters 6C1, 6C2, and 6C3 and mixers 6B3, 6B4, and 6B5 as the frequency converter 6B. Other configurations are the same as those of FIG. 4, and thus descriptions thereof will be omitted.

In the communication controller 7, the frequency controller 7A controls the PLL section 5A such that the carrier frequencies of the R/W request signal (more specifically, in the transmission period of the CW (continuous carrier wave) following the R/W request signal) is constituted by a plurality of frequency components. The carrier signals generated by the PLL section 5A and the transmitters 5D1, 5D2, and 5D3 are combined by the combiner 5E and are transmitted through the modulator 5B and the power amplifier 5C.

The reception signals received at the receiver antenna 4 are branched into three paths after passing the amplifier 6A and are respectively inputted to the band-pass filters 6C1, 6C2, and 6C3. From the reception signals inputted to the band-pass filters 6C1, 6C2, and 6C3, a signal of a specific frequency component is extracted and inputted to the mixers 6B3, 6B4, and 6B5.

The I signal and the Q signal of each frequency components obtained by the mixers 6B3, 6B4, and 6B5 are inputted to the phase information acquirer 8A, and the phase change amount of each frequency component and the distance corresponding to the amount are calculated.

Figure 13:
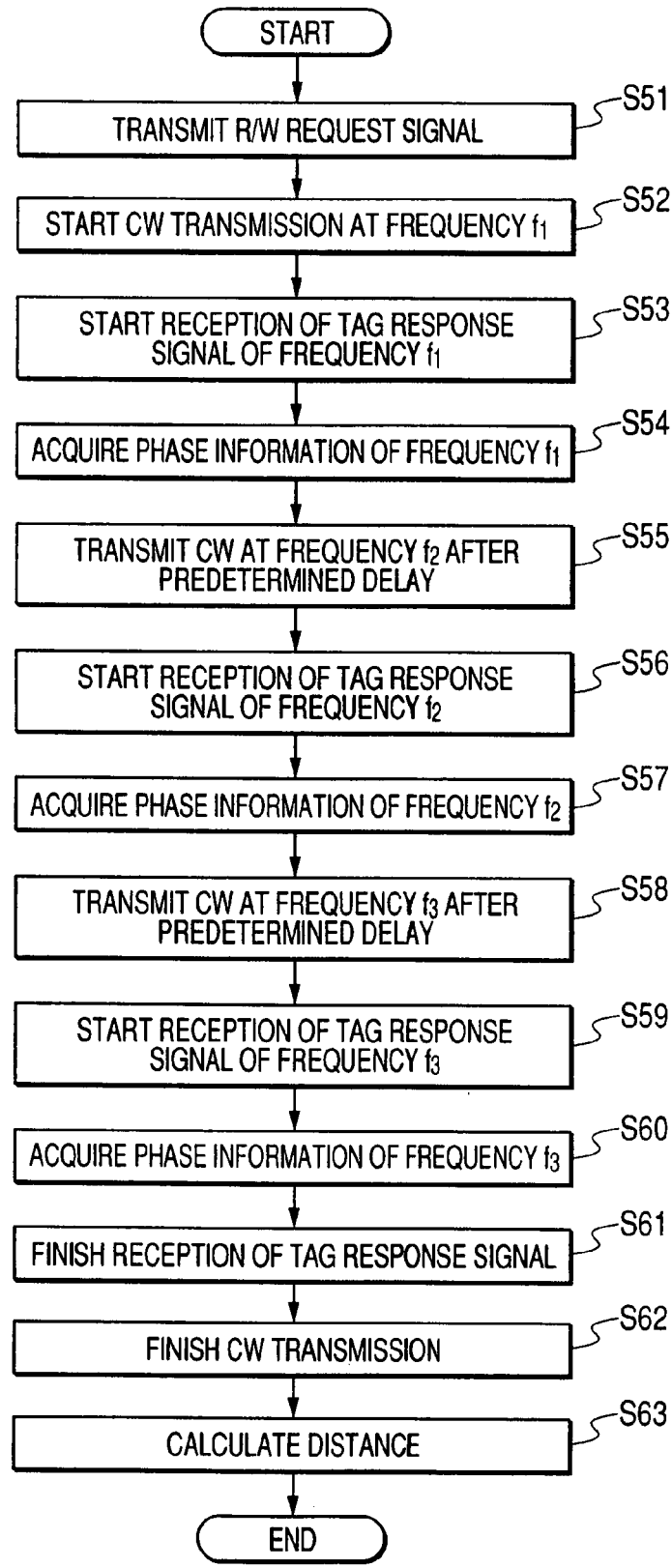
FIG. 13 is a flowchart showing the procedures of the distance measurement processing that involves frequency switching over within one frame.

Similar to the examples of FIGS. 4 and 13, the reception processor 6 calculates the phase change amount of each frequency component when the reception processor 5 is transmitting the CW (continuous carrier wave).

In the above example, the distance r is calculated on the basis of phase. However, the same can be applied to the distance measurement processing employing the MUSIC method. In addition, a configuration is possible in which two reception signals of which the S/N ratio and the signal level of the I and Q signals are higher than those of other reception signals are selected, and the detection of the phase change amount and the location calculation are performed on the basis of the two reception signals selected.

Active RFID Tag

In the above example, the RFID tag 1 has been described with respect to the configuration of the passive one. As described above, however, the RFID tag 1 may have the configuration of the active one. In this case, the RFID tag 1 may have a configuration in which the RFID tag 1 is provided with a battery section, a signal generator that generates the tag response signal, and a frequency controller that is configured to transmit the tag response signal generated by the signal generator via a plurality of different carrier frequencies. In this case, it is possible to obviate the necessity of the reader/writer 2 transmitting the R/W request signal.

Similar to the frequency controller 7A, the frequency controller of the RFID tag 1 may be configured to set a plurality of divided periods in the transmission period of one tag response signal such that different carrier frequencies are used for each of the divided periods. Alternatively, the frequency controller may be configured such that different carrier frequencies are used for each transmission of the tag response signal. Further alternatively, the carrier frequencies may be constituted by a plurality of frequency components.

Application Examples of Communication System Using RFID Tag

Figure 22:
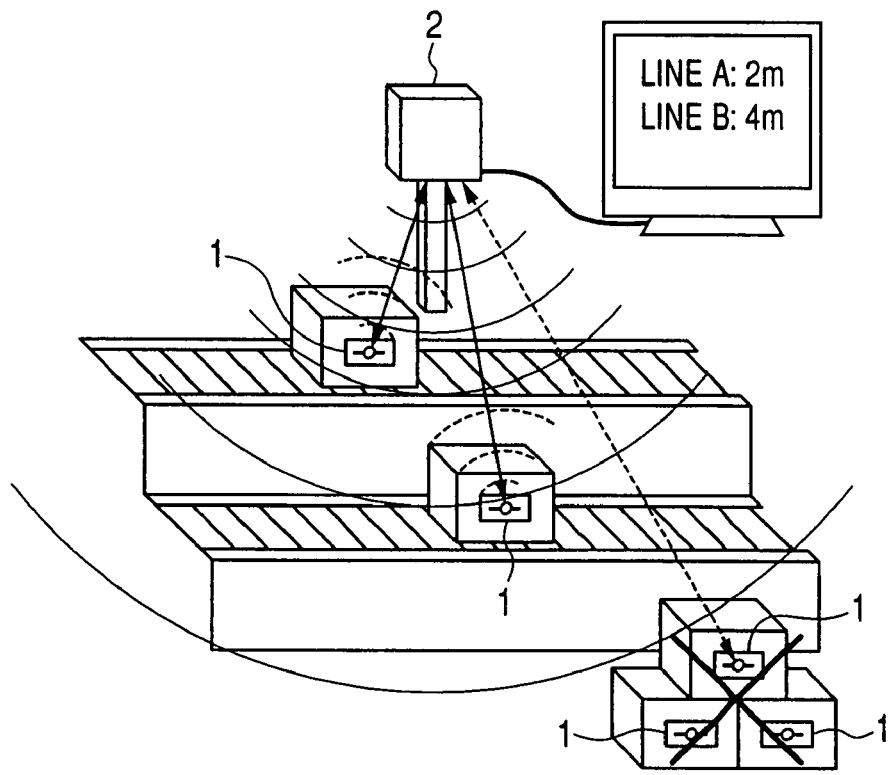
FIG. 22 is a diagram showing an example of a system in which the RFID tag communication system of the invention is applied to a system for inspecting and/or checking articles in circulation.

Next, specific application examples of the communication system using the RFID tag of the present embodiment will be described. FIG. 22 shows an example of a communication system using an RFID tag of the invention is applied to a system for inspecting and/or checking articles in circulation. In the example shown in the drawing, articles having the RFID tag 1 attached thereto are transported via a plurality of belt conveyors. The articles having the RFID tag 1 attached thereto are also stacked on places apart from the belt conveyors. The reader/writer 2 communicates with the RFID tags 1 in order to inspect the articles being transported via the belt conveyors. In this manner, it becomes possible to manage the circulation of the articles.

In such an communication system using an RFID tag, a management apparatus that manages the articles in circulation is provided as the external apparatus for communicating with the reader/writer 2.

In such a communication system using RFID tag, if the communication area is not definitely defined, the system may uselessly communicates with the RFID tags 1 located at a position apart from the belt conveyors, which do not need to be communicated with. To the contrary, according to the communication system using RFID tag of the present embodiment, it is possible to detect the distance to (or location of) each RFID tag 1 by the processing of the reader/writer 2. Accordingly, it becomes possible to communicate with only the RFID tags 1 that need to be communicated with.

According to the communication system using RFID tag of the present embodiment, since the distance to (or location of) each RFID tag 1 can be detected with relatively high precision, the reader/writer 2 becomes possible to identify the belt conveyor line where the RFID tag 1 is being transported.

Only one installation of the reader/writer 2 is sufficient for the construction of the communication system using RFID tag having such functions. In other words, it is possible to obviate the necessity of a member for limiting the reachable range of radio waves or the necessity of installing a plurality of readers and/or writers 2. Therefore, according to the RFID tag communication system of the present embodiment, it becomes possible to perform setting operation in a simple manner regardless of installing environment.

Figure 23A:
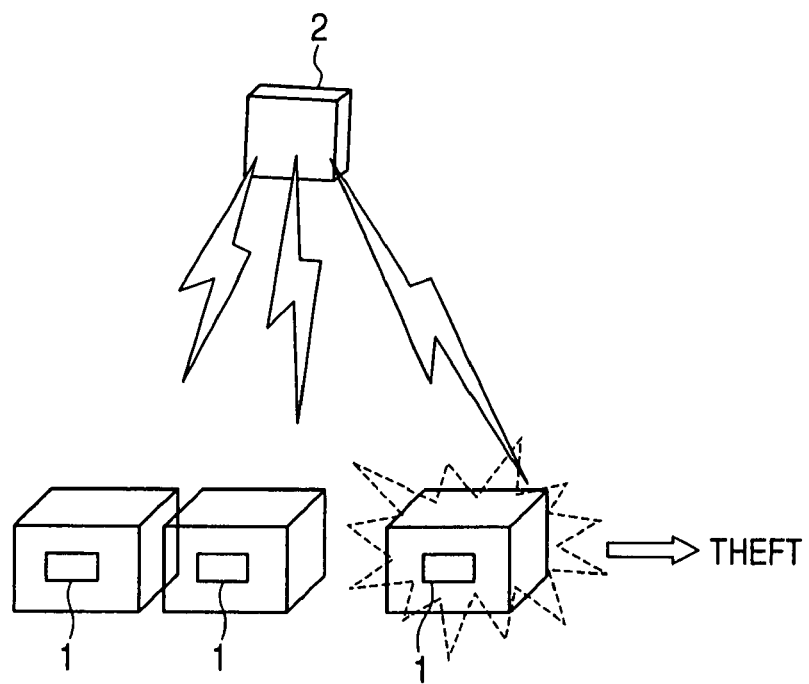
FIG. 23A is a diagram showing an example of a system in which the RFID tag communication system of the invention is applied to a system for surveillance monitoring of products or stored articles.
Figure 23B:
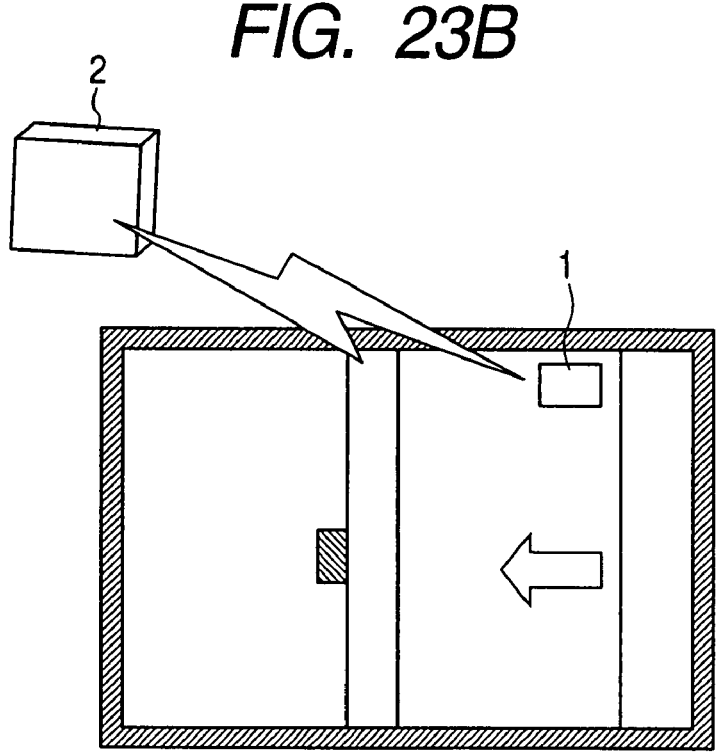
FIG. 23B is a diagram showing an example of a system in which the RFID tag communication system of the invention is applied to an security system in which an RFID tag 1 is attached, for example, to a window or a door; and the position of the RFID tag 1 is monitored, thereby detecting opening of the window or the door.

FIG. 23A shows an example of a system for use in stores, in which the communication system using RFID tag of the invention is applied to a system for surveillance monitoring of products or stored articles. In this example, a communication area is set to a range in which articles having the RFID tag 1 attached thereto are naturally and originally existable. When the article is moved out of the communication area, the movement of the article is detected, thus determining that there is a possibility that the article has been stolen. FIG. 23B shows an example of a system in which the RFID tag communication system of the invention is applied to an security system in which an RFID tag 1 is attached, for example, to a window or a door; and the position of the RFID tag 1 is monitored, thereby detecting opening of the window or the door. The construction of such an security system only requires a simple setting operation, i.e., an operation of attaching the RFID tag 1 to a target object, which is conventionally used. Moreover, it becomes possible to construct the RFID tag communication system under various environments in a flexible manner.

Even in the case of the above example, in the communication system using RFID tag, a management apparatus that manages the security operations is provided as the external apparatus for communicating with the reader/writer 2.

Figure 24:
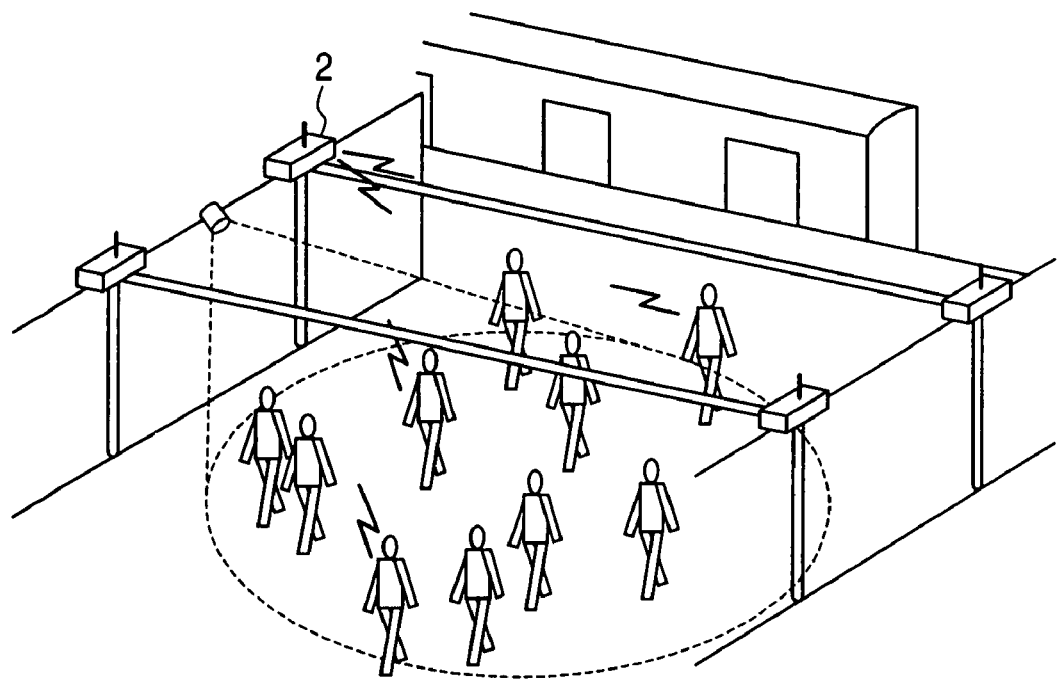
FIG. 24 is a diagram showing an example of a system in which the RFID tag communication system of the invention is applied to the places such as stations or movie theaters where tickets are examined.

FIG. 24 shows an example of a system in which the communication system using RFID tag of the invention is applied to the places such as stations or movie theaters where tickets are examined. Nowadays, a ticket examination system based on RFID tags is widely used for ticket examination in stations, for instance. In such a system, the ticket examination is performed by reader/writers that are provide to gates. To the contrary, according to the communication system using RFID tag of the present embodiment, by setting the whole passage where the ticket examination is made as the communication area, it becomes possible to perform the ticket examination without needing to prepare the gates. In this case, the RFID tag 1 may be installed in portable phones held by users.

In the application example shown in FIG. 24, when the result of communication with the RFID tag 1 shows that there is a user who is not allowed to enter, it is conceivable that it is necessary to specify the disapproved user. In this case, by turning a monitoring camera toward the location of the disapproved user, as specified by the reader/writer 2 so as to capture images of the user, it becomes possible to specify the disapproved user and to store the images as an evidence.

Even in the case of the above example, in the communication system using RFID tag, a management apparatus that manages the entrance approving operations is provided as the external apparatus for communicating with the reader/writer 2. The management apparatus controls the capturing operation of the monitoring camera.

Figure 25:
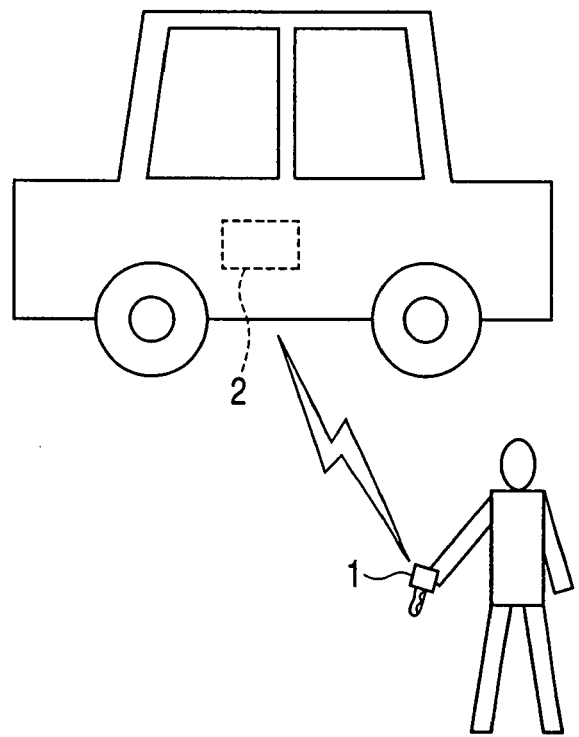
FIG. 25 is a diagram showing an example of a system in which the RFID tag communication system of the invention is applied to a keyless entry system that is suitable for automobiles.
Figure 26:
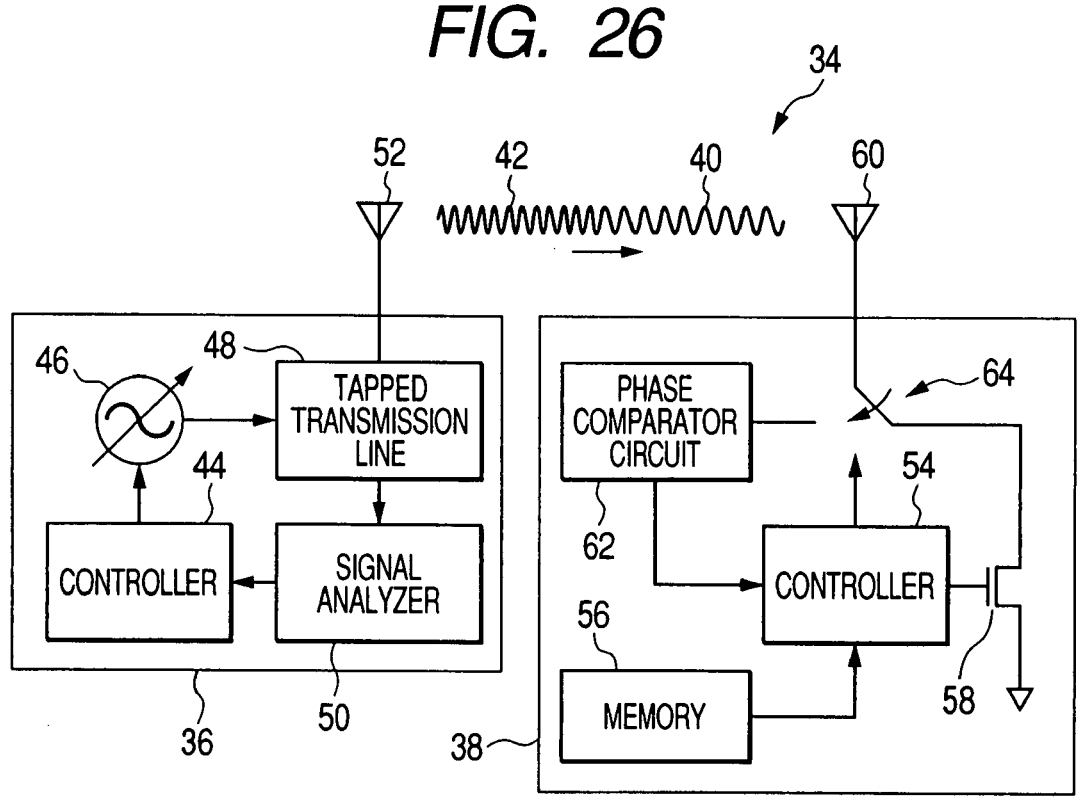
FIG. 26 is a block diagram showing the configuration of an RF communication system according to a prior art technology.
Figure 27:
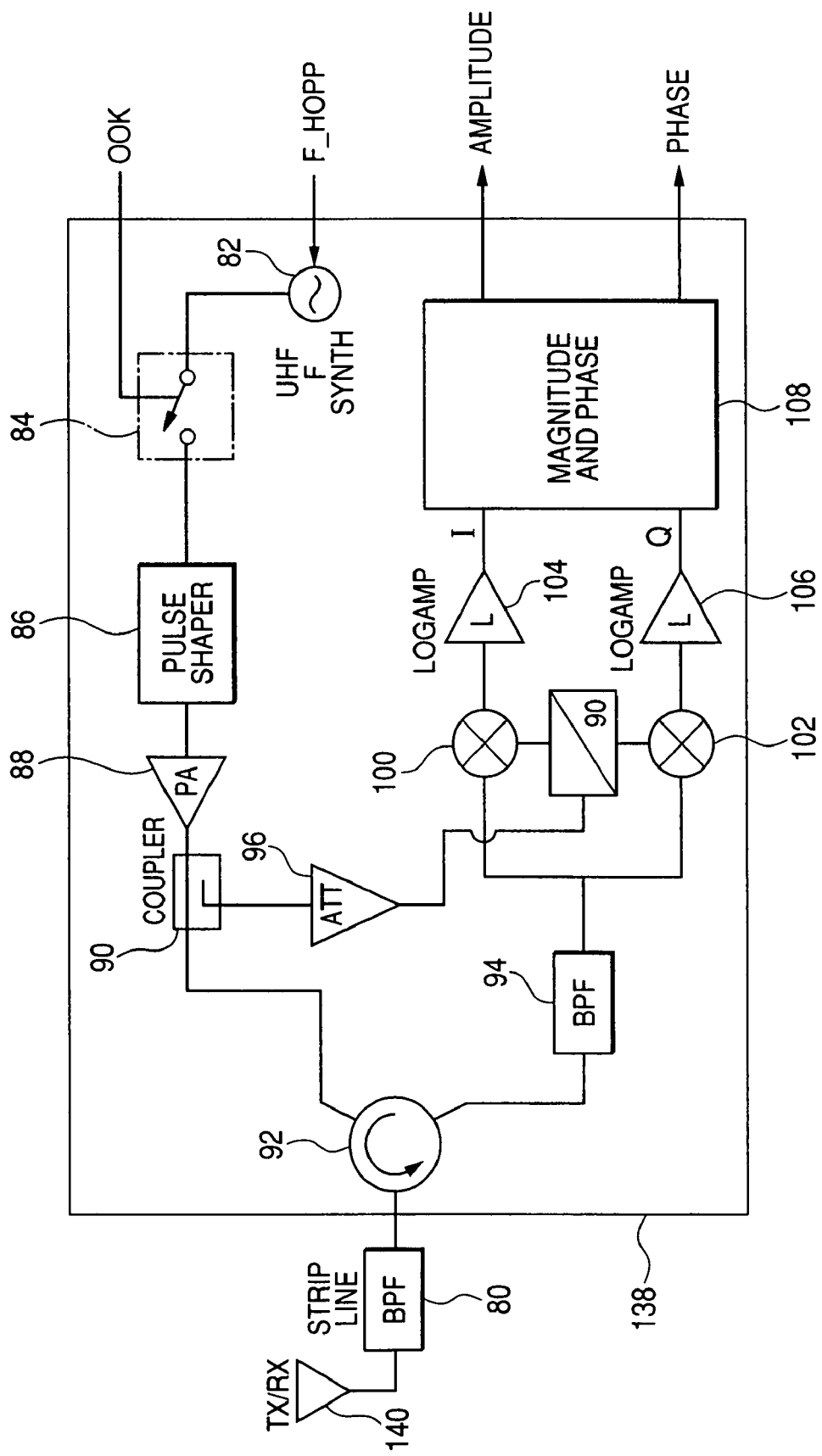
FIG. 27 is a block diagram showing the configuration of a communication apparatus that performs wireless communication with RFID tags in accordance with a prior art technology

FIG. 25 shows an example of a system in which the communication system using RFID tag of the invention is applied to a keyless entry system that is suitable for automobiles. The reader/writer 2 is provided in the interior of an automobile, and a user holds a key having the RFID tag 1 incorporated therein. When detecting that the RFID tag 1 incorporated into the key held on the user is disposed within a prescribed range of a space around the automobile, the reader/writer 2 instructs to unlock the key. With such a configuration, the user can unlock the key only by approaching the automobile while holding the key thereon.

Even in the case of the above example, in the communication system using RFID tag, a management apparatus that controls and manages the lock states of the key is provided as the external apparatus for communicating with the reader/writer 2.

INDUSTRIAL APPLICABILITY

A distance measuring apparatus and a communication system equipped with the tag communication apparatus according to the invention are applicable to, for example, the system for inspecting and/or checking articles in circulation, the system for use in stores for surveillance monitoring of products, the ticket examination system which is installed at places such as stations or movie theaters where tickets are examined, and the keyless entry system.

Although the invention has been described in detail with reference to specific embodiments, it will be apparent to those skilled in the art that various modifications and variations can be made to the above-described embodiments of the present invention without departing from the spirit or scope of the invention.

This application is based on Japanese Patent application No. 2005-066298 filed Mar. 9, 2005, the contents of which is incorporated herein by reference in its entirety.

The invention claimed is:

1. A distance measuring apparatus, comprising:
    a transmitter that transmits a request signal from an antenna to the outside via radio waves having a plurality of different carrier frequencies;
    a receiver that receives a reflection signal which is a signal composed of one frame and is obtained when the request signal transmitted from the transmitter is reflected by a reflector while being modulated;
    a phase information acquirer that calculates a phase change amount between the reflection signal received by the receiver and the request signal for each of the carrier frequencies transmitted from the transmitter; and
    a distance calculator that calculates a distance between the antenna and the reflector on the basis of the carrier frequencies and the phase change amount for each of the carrier frequencies acquired by the phase information acquirer, wherein:
    the receiver comprises a frequency converter that converts the received reflection signal to an I signal and a Q signal;
    the reflection signal is transmitted from the reflector via three or more different carrier frequencies; and
    the phase information acquirer extracts, as a minimal component, one of the I signal and the Q signal that has a smaller signal level for each of the carrier frequencies, selects two carrier frequencies having minimal components greater than that of at least one of the other carrier frequencies, and acquires the phase change amount for each of the selected two carrier frequencies.

2. The distance measuring apparatus as set forth in claim 1, wherein:
    the transmitter sets a plurality of divided periods in a period for transmitting one request signal, and controls such that the different carrier frequencies are used for the respective divided periods.

3. The distance measuring apparatus as set forth in claim 1, wherein:
    the transmitter transmits the request signal via one of the carrier frequencies composed of different carrier frequency components.

4. The distance measuring apparatus as set forth in claim 1, wherein:
    the request signal is a signal composed of one frame; and
    the reflection signal includes a preamble section.

5. The distance measuring apparatus as set forth in claim 1, wherein:
    the distance calculator calculates the distance with high-resolution spectrum analysis.

6. The distance measuring apparatus as set forth in claim 5, wherein:
    the distance calculator utilizes a MUSIC (MUltiple SIgnal Classification) method as the high-resolution spectrum analysis, in which the reflection signal received via the different carrier frequencies is used as an input, a MUSIC evaluation function is obtained using a mode vector as a function of the distance, and the distance is calculated by obtaining peak values of the MUSIC evaluation function.

7. The distance measuring apparatus as set forth in claim 1, wherein:
the distance calculator calculates the distance also on the basis of a reception intensity of the reflection signal received.

8. The distance measuring apparatus as set forth in claim 1, further comprising:
a reception controller that acquires information in a data section of the reflection signal, and outputs, to the outside, the distance calculated by the distance calculator which is associated with the information in the data section.

9. The distance measuring apparatus as set forth in claim 1, wherein:
the distance calculator measures a direction that the reflector that has transmitted the reflection signal is located, on the basis of the reflection signal.

10. The distance measuring apparatus as set forth in claim 1, wherein:
the distance calculator calculates the distance by analyzing a signal in a preamble section of the reflection signal.

11. A communication system, comprising:
the distance measuring apparatus as set forth in claim 1; and
at least one reflector that performs wireless communication with the distance measuring apparatus.

12. A communication system, comprising:
the distance measuring apparatus as set forth in claim 1; and
a management apparatus, that manages at least one of articles, people, and living things that are associated with the reflectors on the basis of a communication result between the distance measuring apparatus and the reflectors.

13. A distance measuring method, comprising:
a transmitting step of transmitting a request signal from an antenna to the outside via radio waves having a plurality of different carrier frequencies;
a receiving step of receiving a reflection signal which is obtained when the request signal transmitted in the transmitting step is reflected from a reflector while being modulated;
a phase information acquisition step of calculating a phase change amount between the reflection signal received in the receiving step and the request signal for each of the carrier frequencies transmitted in the transmitting step; and
a distance calculating step of calculating a distance between the antenna and the reflector on the basis of the carrier frequencies and the phase change amount for each of the carrier frequencies acquired in the phase information acquiring step, wherein:
the receiving step comprises a frequency converting step of converting the received reflection signal to an I signal and a Q signal;
the reflection signal is transmitted from the reflector via three or more different carrier frequencies; and
the phase information acquisition step includes: a step of extracting, as a minimal component, one of the I signal and the Q signal that has a smaller signal level for each of the carrier frequencies, a step of selecting two carrier frequencies having minimal components greater than that of at least one of the other carrier frequencies, and a step of acquiring the phase change amount for each of the selected two carrier frequencies.

14. The distance measuring method as set forth in claim 13, wherein:
the transmitting step is configured to set a plurality of divided periods in a period for transmitting one request signal, and to control such that the different carrier frequencies are used for the respective divided periods.

15. The distance measuring method as set forth in claim 13, wherein:
the transmitting step is configured to transmit the request signal via one of the carrier frequencies composed of different carrier frequency components.

16. The distance measuring method as set forth in claim 13, wherein:
the request is a signal composed of one frame; and
the reflection signal includes a preamble section.

17. The distance measuring method as set forth in claim 13, wherein:
the distance calculating step calculates the distance with high-resolution spectrum analysis.

18. The distance measuring method as set forth in claim 17, wherein:
the distance calculator utilizes a MUSIC (Multiple Signal Classification) method as the high-resolution spectrum analysis, in which the reflection signal received via the different carrier frequencies is used as an input, a MUSIC evaluation function is obtained using a mode vector as a function of the distance, and the distance is calculated by obtaining peak values of the MUSIC evaluation function.

19. The distance measuring method as set forth in claim 13, wherein:
the distance calculating step calculates the distance on the basis of a reception intensity of the reflection signal received.

20. The distance measuring method as set forth in claim 13, further comprising:
a reception control step of acquiring information in a data section of the reflection signal, and outputting, to the outside, the distance calculated by the distance calculator which is associated with the information in the data section.

21. The distance measuring method as set forth in claim 13, wherein:
the distance calculating step measures a direction that the reflector that has transmitted the reflection signal is located, on the basis of the reflection signal.

22. The distance measuring method as set forth in claim 13, wherein:
the distance calculating step calculates the distance by analyzing a signal in a preamble section of the request signal.

* * * * *